(12) United States Patent
Yasuoka et al.

(10) Patent No.: US 7,925,019 B2
(45) Date of Patent: Apr. 12, 2011

(54) METHOD AND APPARATUS FOR CONVERTING DATA, METHOD AND APPARATUS FOR INVERSE CONVERTING DATA, AND RECORDING MEDIUM

(75) Inventors: Tomohiro Yasuoka, Tokyo (JP); Tetsujiro Kondo, Tokyo (JP)

(73) Assignee: Sony Corporation (JP)

( * ) Notice: Subject to any disclaimer, the term of this patent is extended or adjusted under 35 U.S.C. 154(b) by 1252 days.

(21) Appl. No.: 11/362,557

(22) Filed: Feb. 24, 2006

(65) Prior Publication Data

US 2006/0235915 A1    Oct. 19, 2006

(30) Foreign Application Priority Data

Feb. 25, 2005  (JP) .................................. 2005-049955

(51) Int. Cl.
*H04N 7/167* (2011.01)
(52) U.S. Cl. ........ 380/210; 708/304; 708/204; 348/384; 348/423; 382/232; 382/246
(58) Field of Classification Search .................. 708/204; 348/384, 423; 382/232, 246; 380/210
See application file for complete search history.

(56) References Cited

U.S. PATENT DOCUMENTS

| | | | | |
|---|---|---|---|---|
| 5,351,083 | A | * | 9/1994 | Tsukagoshi ................. 348/384.1 |
| 5,793,432 | A | * | 8/1998 | Mishima et al. ......... 375/240.01 |
| 7,218,788 | B2 | * | 5/2007 | Igarashi et al. ............... 382/239 |
| 2006/0235915 | A1 | * | 10/2006 | Yasuoka et al. ............... 708/204 |

FOREIGN PATENT DOCUMENTS

| | | |
|---|---|---|
| EP | 1130917 A2 | 9/2001 |
| EP | 1608164 A1 | 12/2005 |
| JP | 7-023232 A | 1/1995 |
| JP | 7-154605 A | 6/1995 |
| JP | 10-289522 A | 10/1998 |
| JP | 10271505 A | 10/1998 |
| JP | 2001245270 A | 9/2001 |
| JP | 2004289685 A | 10/2004 |

OTHER PUBLICATIONS

Office Action from Japanese Application No. 2005-049955, dated Jul. 8, 2010.

* cited by examiner

*Primary Examiner* — Thanhnga B Truong
*Assistant Examiner* — Mahfuzur Rahman
(74) *Attorney, Agent, or Firm* — Lerner, David, Littenberg, Krumholz & Mentlik, LLP

(57) ABSTRACT

A data converting apparatus includes a segmenting unit for setting a predetermined access unit, as an access unit to be processed, out of input data containing at least one access unit containing a plurality of data components per pixel, and for segmenting the access unit to be processed into at least one block; an analyzing unit for generating a basis for converting an expression format of each of the plurality of data components by respectively setting, as at least one analysis block, at least one segmented block and for performing a main component analysis on the plurality of data components; and a converting unit for converting the expression format of each of the plurality of data components per pixel forming the block to be processed.

20 Claims, 24 Drawing Sheets

FIG. 16
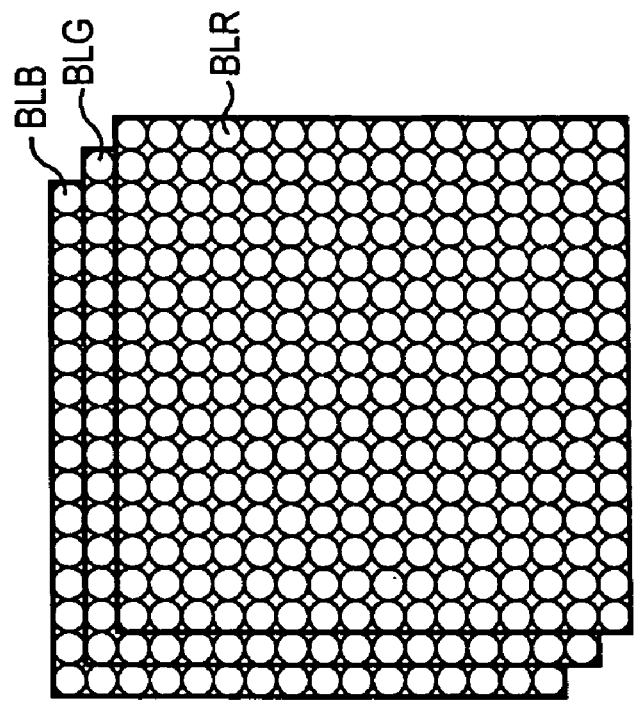
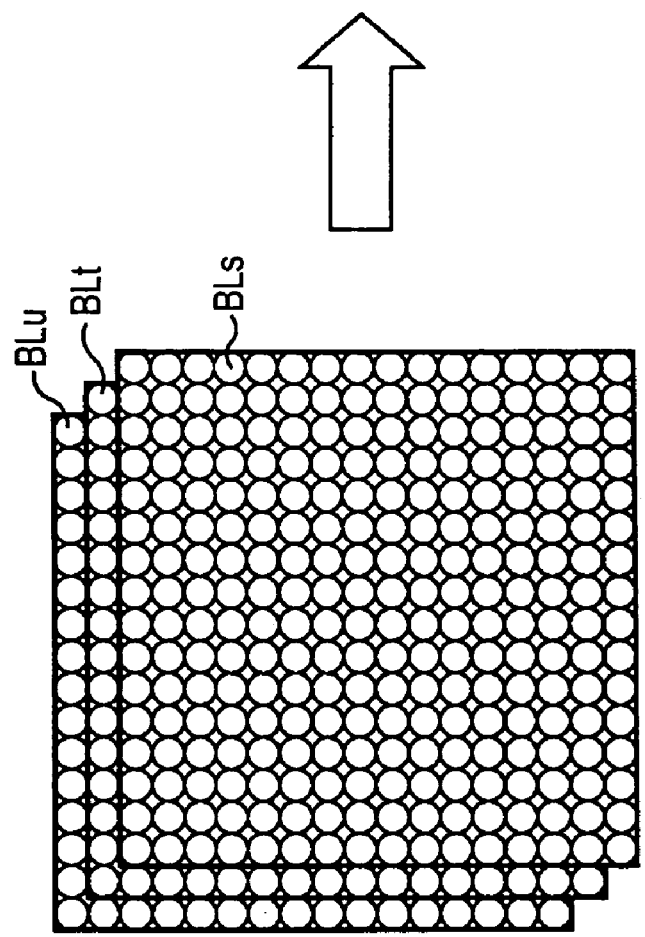

METHOD AND APPARATUS FOR CONVERTING DATA, METHOD AND APPARATUS FOR INVERSE CONVERTING DATA, AND RECORDING MEDIUM

CROSS-REFERENCE TO RELATED APPLICATIONS

The present application claims priority from Japanese Patent Application No. JP 2005-049955 filed on Feb. 25, 2005, the disclosure of which is hereby incorporated by reference herein.

BACKGROUND OF THE INVENTION

The present invention relates to a method and apparatus for converting data, a method and apparatus for inverse converting data, a method and system for processing information, a recording medium, and a computer program. More specifically, the present invention relates to a method and apparatus for converting data, a method and apparatus for inverse converting data, a method and system for processing information, a recording medium, and a computer program for discouraging unauthorized copying using an analog video signal by substantially degrading the video data in second and subsequent encoding and decoding operations in a manner free from any inconveniences, such as an increase in circuit scale, involved.

FIG. 1 illustrates a known video display system. The video display system includes a reproducing apparatus 1 and a display 2.

The reproducing apparatus 1 includes a decoder 11 and digital-to-analog (D/A) converter 12. The decoder 11 decodes encoded digital video signal reproduced from a recording medium such as an optical disk (not shown), and supplies a digital video signal Vdg0, obtained as a result, to the D/A converter 12. The D/A converter 12 converts the digital video signal Vdg0 into an analog video signal Van, and outputs the analog video signal Van to the outside. The analog video signal Van, output from the reproducing apparatus 1, is supplied to the display 2.

The display 2, composed of a cathode-ray tube (CRT) display, a liquid-crystal display (LCD), or the like, displays an image corresponding to the analog video signal Van supplied from the reproducing apparatus 1.

As shown in FIG. 1, a known encoding apparatus 3 includes an analog-to-digital (A/D) converter 21, an encoder 22, and a recorder 23. Unauthorized copying can be performed using the analog video signal Van output from the encoding apparatus 3 and the reproducing apparatus 1.

When the analog video signal Van output from the reproducing apparatus 1 is input to the encoding apparatus 3, the A/D converter 21 analog-to-digital converts the analog video signal Van, thereby outputting the resulting digital video signal Vdg' to the encoder 22. The encoder 22 encodes the digital video signal Vdg', thereby outputting the resulting encoded digital video signal Vcd' to the recorder 23. The recorder 23 records the encoded digital video signal Vcd' onto a recording medium such as an optical disk (not shown). Unauthorized copying can thus be performed.

Japanese Unexamined Patent Application Publication No. 2001-245270 discloses one technique. In accordance with the disclosed technique, an analog video signal Van, which is copyright protected, is scrambled or prevented from being output to control unauthorized copying using the analog video signal Van.

In accordance with Japanese Unexamined Patent Application Publication No. 10-289522, a compression decoding unit in at least one of a reproducing section and a recording section includes a noise information generator. Noise information that cannot be identified by only a single video reproduction process is embedded in a digital video signal. Copying operation itself is enabled. If a copying operation is repeated by a plurality of times, an image is severely degraded, and the number of copying cycles is thus limited in practice.

In accordance with the technique disclosed in Japanese Unexamined Patent Application Publication No. 2001-245270, unauthorized copying is controlled because the analog video signal Van is scrambled or prevented from being output. On the other hand, a normal image cannot be displayed on the display 2, either.

In accordance with the technique disclosed in Japanese Unexamined Patent Application Publication No. 10-289522, the reproducing section and/or the recording section needs the noise information generator and a circuit for embedding noise information. Circuit scale is thus increased.

More specifically, although unauthorized copying using the analog video signal Van is prevented in accordance with the techniques disclosed in Japanese Unexamined Patent Application Publication Nos. 2001-245270 and 10-289522, an appropriate image cannot be displayed on the display 2 and the circuit scale is increased.

Japanese Unexamined Patent Application Publication No. 2004-289685 assigned to the same assignee of the present invention proposes a technique that controls unauthorized copying using the analog video signal in a manner free from the problems that no correct images are displayed, and that the circuit scale is increased.

In accordance with the technique proposed in Japanese Unexamined Patent Application Publication No. 2004-289685, a phase of a digital video signal that is obtained by analog-to-digital converting an analog video signal is shifted, and the phase-shifted digital video signal is encoded. Copying is made impossible without degrading the quality of an image, i.e., with the quality of the image maintained. Thus, unauthorized copying using the analog video signal is discouraged.

The technique proposed in Japanese Unexamined Patent Application Publication No. 2004-289685 makes unauthorized copying difficult. In the current environment where digital content is widely available, there is a need for a further technique for unauthorized copying prevention in addition to the technique proposed in Japanese Unexamined Patent Application Publication No. 2004-289685.

SUMMARY OF THE INVENTION

It is thus desired that unauthorized copying using an analog video signal be prevented by severely degrading video data in second and subsequent encoding and decoding operations in a manner free from no image displaying and an increase in circuit scale.

A data converting apparatus of one embodiment of the present invention includes a segmentor operable to set a predetermined access unit, as an access unit to be processed, out of input data containing at least one access unit containing a plurality of data components per pixel, and to segment the predetermined access unit into at least one block; an analyzer operable to generate, on a per analysis block basis, a basis for converting an expression format of each of the plurality of data components by respectively setting, as at least one analysis block, the at least one segmented block, and to perform a main component analysis on the plurality of data components on a per at least one analysis block basis; and a converter operable to convert the expression format of each of the plurality of data components per pixel forming the block to be processed, by successively setting, as at least one block to be processed, the at least one segmented block, and by using a predetermined one of at least one basis generated by the analyzer.

The data converting apparatus may further include an analog distortion generator operable to generate an analog distortion in the input data.

The converter may encode, on a per predetermined unit basis, a data group containing the plurality of data components per pixel in the converted expression format in the block to be processed.

The data converting apparatus may further include a vectorizer operable to generate an N-dimensional first vector having values of N data components (N is an integer equal to 1 or larger) as element values thereof per pixel, on every M pixels (M is an integer equal to 1 or larger) in a block to be processed, by successively setting, as the block to be processed on a one-by-one basis, the at least one segmented block. The analyzer may generate the basis of the block to be analyzed by performing the main component analysis on the M first vectors generated by the vectorizer when the block to be analyzed becomes the block to be processed.

Preferably, the converter respectively converts the M first vectors of the block to be processed, from among the first vectors represented by a first coordinate system having each of the N data components as an axis thereof, into M second vectors represented by a second coordinate system having, as an axis, the basis generated by the analyzer when the block to be processed becomes the block to be analyzed.

The converter may encode, on a per predetermined unit basis, a data group containing the M second vectors in the block to be processed.

The plurality of data components may include first pixel data representing a red luminance level of a corresponding pixel, second pixel data representing a green luminance level of the corresponding pixel, and a third luminance level representing a blue luminance level of the corresponding pixel.

A data converting method of another embodiment of the present invention for converting at least part of an expression format of input data containing at least one access unit containing a plurality of data components per pixel, includes setting a predetermined access unit of the input data, as an access unit to be processed, and segmenting the predetermined access unit into at least one block; generating, on a per analysis block basis, a basis for converting an expression format of each of the plurality of data components by respectively setting, as at least one analysis block, at least one segmented block, and performing a main component analysis on the plurality of data components on a per at least one analysis block basis; and converting the expression format of each of the plurality of data components per pixel forming the block to be processed by successively setting, as at least one block to be processed, the at least one segmented block, and by using a predetermined one of at least one basis generated in the analyzing step.

A recording medium of yet another embodiment of the present invention stores a computer program for causing a computer to perform a data converting method of converting at least part of an expression format of input data containing at least one access unit containing a plurality of data components per pixel. The data converting method includes setting a predetermined access unit of the input data, as an access unit to be processed, and segmenting the predetermined access unit into at least one block; generating, on a per analysis block basis, a basis for converting an expression format of each of the plurality of data components by respectively setting, as at least one analysis block, at least one segmented block, and performing a main component analysis on the plurality of data components on a per at least one analysis block basis; and converting the expression format of each of the plurality of data components per pixel forming the block to be processed by successively setting, as at least one block to be processed, at least one segmented block, and by using a predetermined one of at least one basis generated in the analyzing step.

In accordance with embodiments of the present invention, the expression format of at least part of the input data containing at least one access unit containing the plurality of data components per pixel is converted. More specifically, a predetermined access unit is set as an access unit to be processed out of input data containing at least one access unit containing a plurality of data components per pixel, and the access unit to be processed is segmented into at least one block. The at least one block is respectively set as at least one analysis block, and the main component analysis is performed on the plurality of data components on a per at least one analysis block basis, and the basis for converting the expression format of each of the plurality of data components is thus generated on a per analysis block basis. At least one segmented block is successively set as a block to be processed. Using a predetermined basis of at least one generated basis to be analyzed, the expression format of the plurality of data components per pixel forming the block to be processed is thus converted.

Another embodiment of the present invention relates to a data inverse converting apparatus in a system in which a predetermined first access unit is set as an access unit to be processed out of original data containing at least one first access unit containing a plurality of data components per pixel, and the first access unit to be processed is segmented into at least one block. The at least one segmented block is successively set as at least one analysis block, a main component analysis is performed on each of the plurality of data components on a per at least one analysis block basis, and a basis for converting an expression format of each of the plurality of data components is generated on a per analysis block basis. At least one segmented block is successively set as a block to be processed, the expression format of each of the plurality of data components per pixel forming the block to be processed is converted using a predetermined one of at least one generated basis, a second access unit containing the plurality of data components per pixel in the converted expression format is generated, and the data inverse converting apparatus receives input data containing the basis being input as part of the input data, the basis being used to generate the second access unit. The data inverse converting apparatus includes a separator operable to separate the input data into the second access unit and the basis; and an inverse converter operable to inverse convert, using the separated basis, the expression format of the plurality of data components per pixel forming the separated second access unit.

A further embodiment of the present invention relates to a data inverse converting method of a data inverse converting apparatus in a system in which a predetermined first access unit is set as an access unit to be processed out of original data containing at least one first access unit containing a plurality of data components per pixel, and the first access unit to be processed is segmented into at least one block. The at least one segmented block is successively set as at least one analysis block, a main component analysis is performed on each of the plurality of data components on a per at least one analysis block basis, and a basis for converting an expression format of each of the plurality of data components is generated on a per analysis block basis. At least one segmented block is successively set as a block to be processed, the expression format of each of the plurality of data components per pixel forming the block to be processed is converted using a predetermined one of at least one generated basis, a second access unit containing the plurality of data components per pixel in the converted expression format is generated, and the data inverse converting apparatus receives input data containing the basis being input as part of the input data, the basis being used to generate the second access unit. The data inverse converting method includes separating the input data into the second access unit and the basis; and inverse converting, using the separated basis, the expression format of the plurality of data components per pixel forming the separated second access unit.

A still further embodiment of the present invention relates to a recording medium storing a computer program for causing a computer to perform a data inverse converting method of a data inverse converting apparatus in a system in which a predetermined first access unit is set as an access unit to be processed out of original data containing at least one first access unit containing a plurality of data components per pixel, and the first access unit to be processed is segmented into at least one block. The at least one segmented block is successively set as at least one analysis block, a main component analysis is performed on each of the plurality of data components on a per at least one analysis block basis, and a basis for converting an expression format of each of the plurality of data components is generated on a per analysis block basis. The at least one segmented block is successively set as a block to be processed, the expression format of each of the plurality of data components per pixel forming the block to be processed is converted using a predetermined one of at least one generated basis, a second access unit containing the plurality of data components per pixel in the converted expression format is generated, and the data inverse converting apparatus receives input data containing the basis being input as part of the input data, the basis being used to generate the second access unit. The data inverse converting method includes separating the input data into the second access unit and the basis; and inverse converting, using the separated basis, the expression format of the plurality of data components per pixel forming the separated second access unit.

In accordance with embodiments of the present invention, the predetermined access unit is set as an access unit to be processed out of the original data containing at least one access unit containing the plurality of data components per pixel, and the access unit to be processed is segmented into at least one block. The at least one segmented block is successively set as at least one analysis block, and the main component analysis is performed on each of the plurality of data components on a per at least one analysis block basis. The basis for converting the expression format of each of the plurality of data components is generated on a per analysis block basis. The at least one segmented block is successively set as a block to be processed, and the expression format of each of the plurality of data components per pixel forming the block to be processed is converted using a predetermined one of at least one generated basis. As a result, the second access unit composed of the plurality of data components per pixel in the converted expression format is generated. The input data containing the basis input as part of the input data is input, the basis being used to generate the second access unit. The input data is separated into the second access unit and the basis associated with the second access unit. At least one unit of encoded data separated from the input data is set as one unit of encoded data to be processed, and the one unit of encoded data is decoded. The expression format of the plurality of data components per pixel forming the separated second access unit is inverse converted using the basis separated from the input data.

Another embodiment of the present invention relates to a data inverse converting apparatus in a system in which a predetermined access unit is set as an access unit to be processed out of original data containing at least one access unit containing a plurality of data components per pixel, and the access unit to be processed is segmented into at least one block. The at least one segmented block is successively set as at least one analysis block, a main component analysis is performed on each of the plurality of data components on a per at least one analysis block basis, and a basis for converting an expression format of each of the plurality of data components is generated on a per analysis block basis. The at least one segmented block is successively set as a block to be processed, the expression format of each of the plurality of data components per pixel forming the block to be processed is converted using a predetermined one of at least one generated basis, a data group containing the plurality of data components per pixel in the converted expression format is encoded, at least one unit of encoded data respectively corresponding to at least one block is obtained, and the inverse converting apparatus receives input data containing the basis being input as part of the input data, the basis being used to generate and being associated with the at least one unit of encoded data. The data inverse converting apparatus includes a separator operable to separate the input data into the at least one unit of encoded data and the basis associated with the at least one unit of encoded data; and an inverse converter operable to successively set the at least one separated unit of encoded data as a unit of encoded data to be processed one by one, to decode the unit of encoded data to be processed, and to inverse convert, using the basis associated with the unit of encoded data to be processed from among the bases separated from the input data, the expression format of the plurality of data components per pixel forming the data group obtained as a result of decoding.

The original data may contain an analog distortion.

The at least one block is successively set one by one as a unit of block to be processed, and N-dimensional first vectors having values of N data components (N being an integer equal to 2 or larger) as component values per pixel are generated every M pixels (M being an integer equal to 1 or larger) corresponding to the block to be processed. The basis of the block to be analyzed is generated when the main component analysis is performed on the M first vectors that are generated after the block to be analyzed becomes the block to be processed. Each of the M first vectors of the block to be processed, from among the first vectors represented by a first coordinate system having as an axis each of the N data components, is converted into each of M second vectors represented by a second coordinate system having as an axis thereof the basis generated when the block to be processed becomes the block to be analyzed, the data group containing the M second vectors is encoded on a per predetermined unit basis, and as a result, at least one unit of encoded data corresponding to at least one block is obtained. The inverse converter may decode one of encoded data to be processed, and respectively inverse converts the M second vectors forming the data group obtained as a result of decoding the one of encoded data to be processed, into the M first vectors using the basis associated with the one unit of encoded data to be processed.

The plurality of data components may include first pixel data representing a red luminance level of a corresponding pixel, second pixel data representing a green luminance level of the corresponding pixel, and a third luminance level representing a blue luminance level of the corresponding pixel.

Another embodiment of the present invention relates to a data inverse converting method of a data inverse converting apparatus in a system in which a predetermined access unit is set as an access unit to be processed out of original data containing at least one access unit containing a plurality of data components per pixel, and the access unit to be processed is segmented into at least one block. The at least one segmented block is successively set as at least one analysis block, a main component analysis is performed on each of the plurality of data components on a per at least one analysis block basis, and a basis for converting an expression format of each of the plurality of data components is generated on a per analysis block basis. The at least one segmented block is successively set as a block to be processed, the expression format of each of the plurality of data components per pixel forming the block to be processed is converted using a predetermined one of at least one generated basis, a data group containing the plurality of data components per pixel in the converted expression format is encoded, at least one unit of encoded data respectively corresponding to at least one block is obtained, and the inverse converting apparatus receives input data containing a basis being input as part of the input data, the basis being used to generate and being associated with at least one unit of encoded data. The data inverse converting method includes separating the input data into at least one unit of encoded data and the basis associated with the at least one unit of encoded data; and successively setting the at least one separated unit of encoded data as a unit of encoded data to be processed one by one, decoding the unit of encoded data to be processed, and inverse converting, using the basis associated with the unit of encoded data to be processed from among the bases separated from the input data, the expression format of the plurality of data components per pixel forming the data group obtained as a result of decoding.

Yet a further embodiment of the present invention relates to a recording medium storing a computer program for causing a computer to perform a data inverse converting method of a data inverse converting apparatus in a system in which a predetermined access unit is set as an access unit to be processed out of original data containing at least one access unit containing a plurality of data components per pixel, and the access unit to be processed is segmented into at least one block. The at least one segmented block is successively set as at least one analysis block, a main component analysis is performed on each of the plurality of data components on a per at least one analysis block basis, and a basis for converting an expression format of each of the plurality of data components is generated on a per analysis block basis. The at least one segmented block is successively set as a block to be processed, the expression format of each of the plurality of data components per pixel forming the block to be processed is converted using a predetermined one of at least one generated basis, a data group containing the plurality of data components per pixel in the converted expression format is encoded, at least one unit of encoded data respectively corresponding to the at least one block is obtained, and the inverse converting apparatus receives input data containing the basis being input as part of the input data, the basis being used to generate and being associated with at least one unit of encoded data. The data inverse converting method includes separating the input data into at least one unit of encoded data and the basis associated with the at least one unit of encoded data; and successively setting at least one separated unit of encoded data as a unit of encoded data to be processed one by one, decoding the unit of encoded data to be processed, and inverse converting, using the basis associated with the unit of encoded data to be processed from among the bases separated from the input data, the expression format of the plurality of data components per pixel forming the data group obtained as a result of decoding.

In accordance with embodiments of the present invention, the predetermined access unit is set as an access unit to be processed out of the original data containing at least one access unit containing the plurality of data components per pixel, and the access unit to be processed is segmented into at least one block. The at least one segmented block is successively set as at least one analysis block, and the main component analysis is performed on each of the plurality of data components on a per at least one analysis block basis. The basis for converting the expression format of each of the plurality of data components is generated on a per analysis block basis, at least one segmented block is successively set as one block to be processed, and the expression format of each of the plurality of data components per pixel forming the block to be processed is converted using a predetermined one of at least one generated basis. As a result, at least one unit of encoded data corresponding to at least one block is obtained. The input data containing the basis, which is used to generate and associated with at least one unit of encoded data, is input. The input data is separated into at least one unit of encoded data and the basis associated with the at least one unit of encoded data. The at least one unit of encoded data separated from the input data is set as one unit of encoded data to be processed, and the one unit of encoded data is decoded. The expression format of the plurality of data components per pixel forming the data group obtained as a result of decoding is inverse converted using the basis corresponding to the unit of encoded data from among the bases separated from the input data.

BRIEF DESCRIPTION OF THE DRAWINGS

FIG. 16 illustrates a process of a block decomposer of FIG. 14;

DETAILED DESCRIPTION

Figure 2:
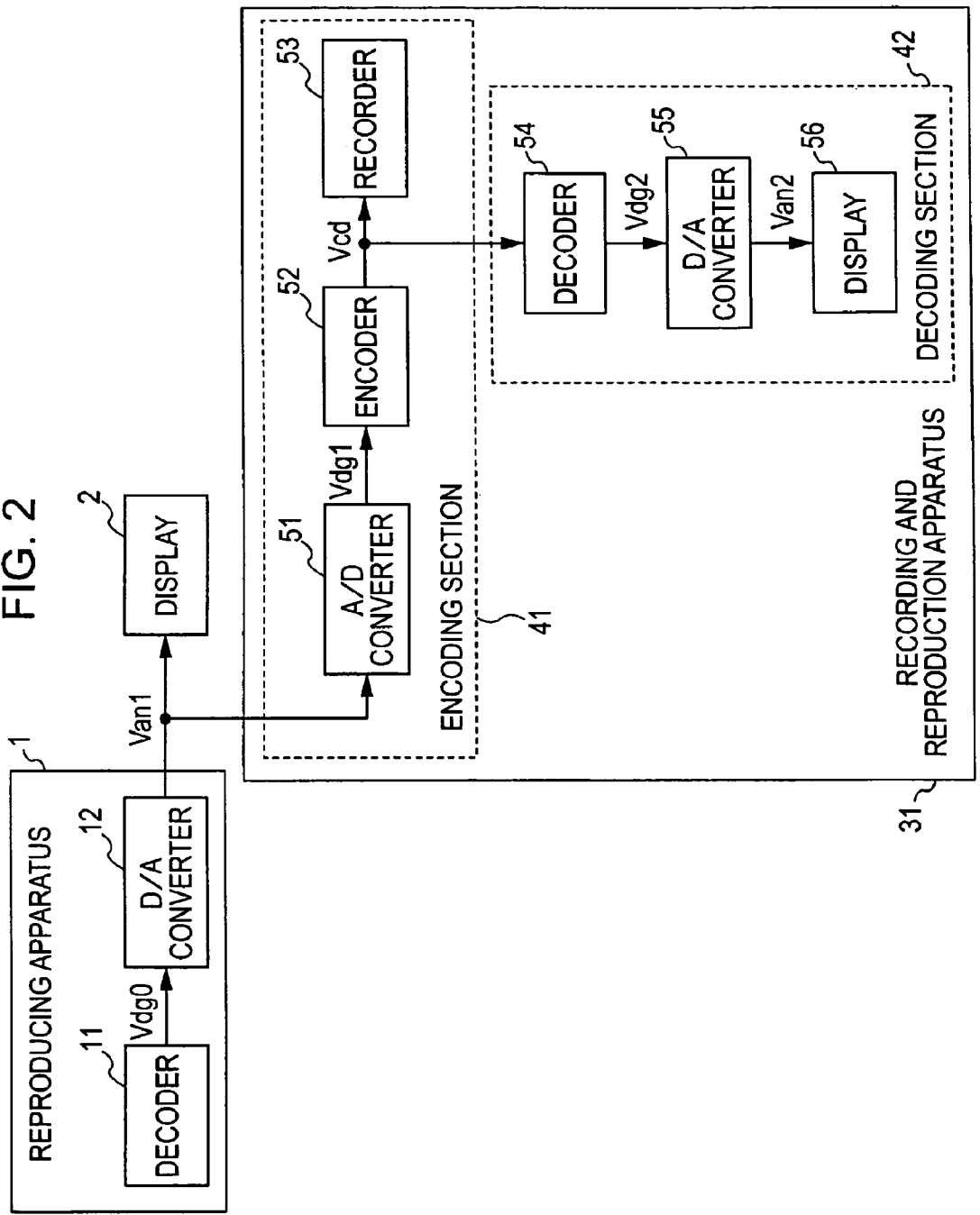
FIG. 2 is a block diagram of a video processing system of one embodiment of the present invention.

The embodiments of the present invention are described below with reference to the drawings. FIG. 2 illustrates a video processing system of one embodiment of the present invention.

Figure 1:
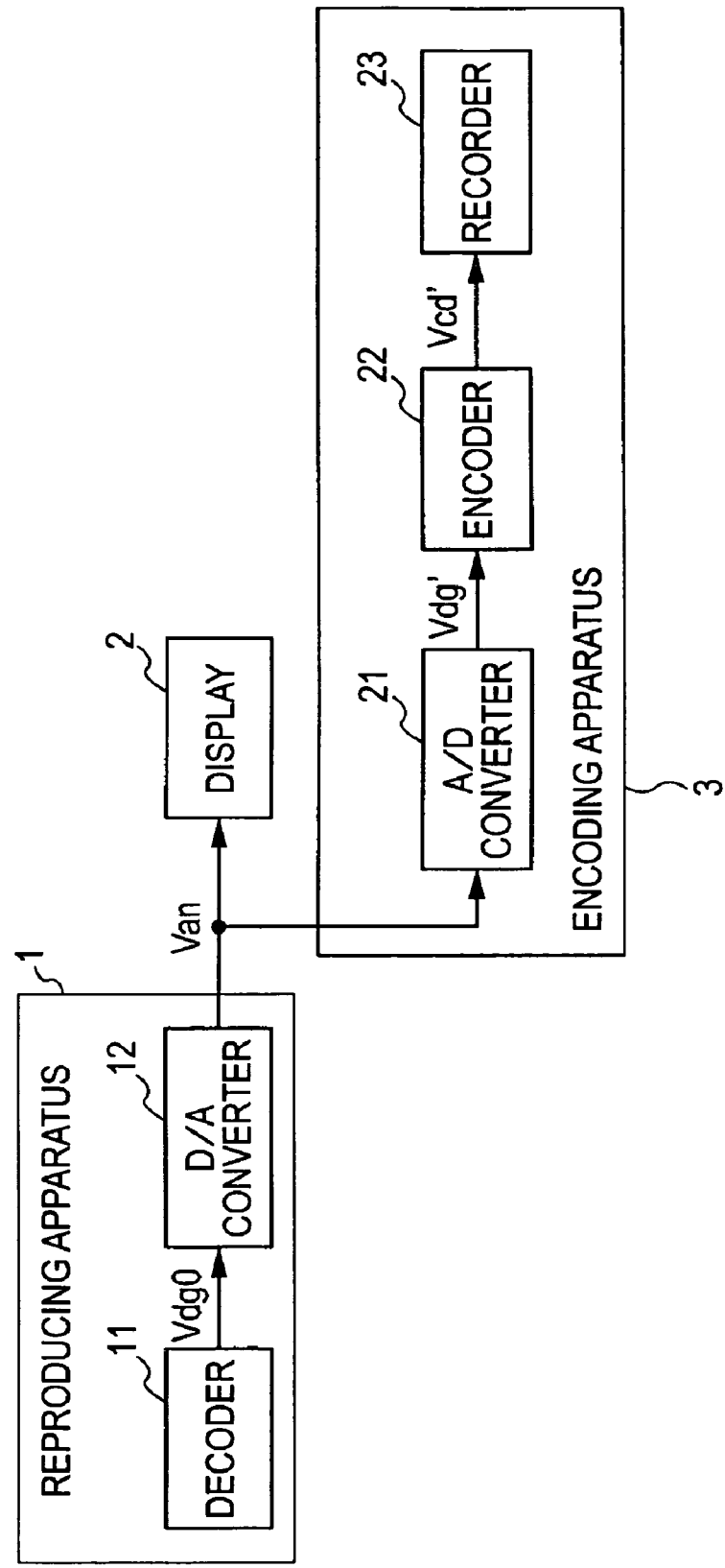
FIG. 1 is a block diagram of a known video display system.

Referring to FIG. 2, elements identical to those discussed with reference to FIG. 1 are designated with the same reference numerals and the discussion thereof is omitted as appropriate. An analog video signal output from a reproducing apparatus 1 is designated with Van in FIG. 1 but the counterpart in FIG. 2 is designated with Van1. The reference symbol Van1 is used to discriminate from Van2 output from a D/A converter 55.

As shown in FIG. 2, the video processing system includes the reproducing apparatus 1, a display 2, and a recording and encoding apparatus 31. A system including the known video processing system of FIG. 1 and the recording and encoding apparatus 31 added thereto constitutes the video processing system of one embodiment of the present invention.

The analog video signal Van1 output from the reproducing apparatus 1 contains an analog distortion. The analog distortion herein refers to a distortion that takes place in the signal when the signal is digital-to-analog (D/A) converted. The analog distortion includes a distortion that takes place in a resulting analog signal when a digital signal is D/A converted into the analog signal by a D/A converter 12 in the reproducing apparatus 1. More specifically, the analog distortion includes a distortion that takes place in a signal when a high-frequency component is removed from the signal, and a distortion that takes place in a signal when the signal is shifted in phase. Available as methods to evaluate image degradation due to the analog distortion are a signal-to-noise (S/N) evaluation method and a visual evaluation method (from the standpoint of visual degradation). The analog distortion may be naturally or artificially generated (reference is made to an analog distortion adder 451 of FIG. 26 to be discussed later).

As shown in FIG. 2, the recording and encoding, apparatus 31 includes an encoding section 41 and a decoding section 42. More specifically, the encoding section 41 is one example of an encoding apparatus as a data converting apparatus of one embodiment of the present invention, and the decoding section 42 is one example of a decoding apparatus as a data inverse converting apparatus of one embodiment of the present invention. As shown in FIG. 2, the single recording and encoding apparatus 31 includes the single encoding section 41 and the single decoding section 42. Alternatively, the encoding section 41 is separately arranged from the decoding section 42 in the video processing system.

As shown in FIG. 2, the encoding section 41 includes an A/D converter 51, an encoder 52, and a recorder 53.

The A/D converter 51 A/D converts the analog video signal Van1 output from the reproducing apparatus 1 into a digital video signal Vdg1, and supplies the digital video signal Vdg1 to the encoder 52. The encoder 52 encodes the digital video signal Vdg1 into an encoded digital video signal Vcd, and supplies the resulting encoded digital video signal Vcd to the recorder 53. The recorder 53 records the encoded digital video signal Vcd onto a recording medium (not shown), such as an optical disk.

As shown in FIG. 2, the decoding section 42 includes a decoder 54, a D/A converter 55, and a display 56.

The decoder 54 decodes the encoded digital video signal Vcd output from the encoder 52 into a digital video signal vdg2, and supplies the resulting the digital video signal vdg2 to the D/A converter 55. The D/A converter 55 D/A converts the digital video signal vdg2 into an analog video signal Van2 and then supplies the resulting analog video signal Van2 to the display 56. The display 56, including a cathode-ray tube (CRT), a liquid-crystal display (LCD), or the like, displays an image corresponding to the analog video signal Van2 supplied from the D/A converter 55.

The digital video signal Vdg2 is obtained when the encoded digital video signal Vcd output from the encoder 52 in the encoding section 41 of FIG. 2 is decoded again by the decoder 54. The digital video signal Vdg2 is different from a digital signal that is obtained when encoded digital video signal Vcd' output from the encoder 22 in the known encoding apparatus 3 of FIG. 1 is decoded again. The digital video signal Vdg2 is substantially degraded from a digital video signal Vdg0 output from the decoder 11 in the reproducing apparatus 1. In other words, the encoder 52 performs an encoding process so that the digital video signal Vdg2 obtained when the decoder 54 performs a decoding process is substantially degraded from the digital video signal Vdg0 output from the decoder 11 in the reproducing apparatus 1.

An image resulting from reproducing the encoded digital video signal Vcd recorded on the recording medium by the recorder 53 is substantially degraded from an image corresponding to analog video signal Van1 output from the reproducing apparatus 1, namely, an image to be displayed on the display 2. Each time the encoding process by the encoding section 41 or an equivalent encoding unit and the decoding process by the decoding section 42 or an equivalent decoding unit are repeated, the degree of degradation becomes severe.

The encoding section 41 of FIG. 2 cannot perform a copying process with excellent image quality maintained. Unauthorized copying is thus prevented.

In the video processing system of FIG. 2, the recording and encoding apparatus 31 makes it difficult to perform a copying process with excellent quality maintained. The analog video signal Van1 supplied from the reproducing apparatus 1 to the display 2 is free from any manipulation. The image supplied to the display 2 is not degraded in image quality. The video processing system of FIG. 2 overcomes the problem associated with the technique disclosed in Japanese Unexamined Patent Application Publication No. 2001-245270.

As shown in FIG. 2, the video processing system is free from mounting particular circuits such as a noise information generator and a circuit required for embedding noise information. In other words, the video processing system of FIG. 2 overcomes the problem associated with the technique disclosed in Japanese Unexamined Patent Application Publication No. 10-289522.

The problems associated with the known techniques are thus overcome if the encoder 52 performs the encoding process so that the digital video signal Vdg2 output in response to the decoding process of the decoder 54 is substantially degraded in comparison with the digital video signal Vdg0 output from the decoder 11 in the reproducing apparatus 1. The encoder 52 simply performs the encoding process, and is not limited to any particular form. The encoder 52 may thus take any of a variety of forms. Along with any form taken by the encoder 52, the decoder 54 may also take a corresponding form.

Referring to FIGS. 3 through 21, the encoder 52 performing the encoding process involving a main component analysis and the decoder 54 performing the respective decoding process are discussed in accordance with embodiments of the present invention. The main component analysis will be described later.

Figure 3:
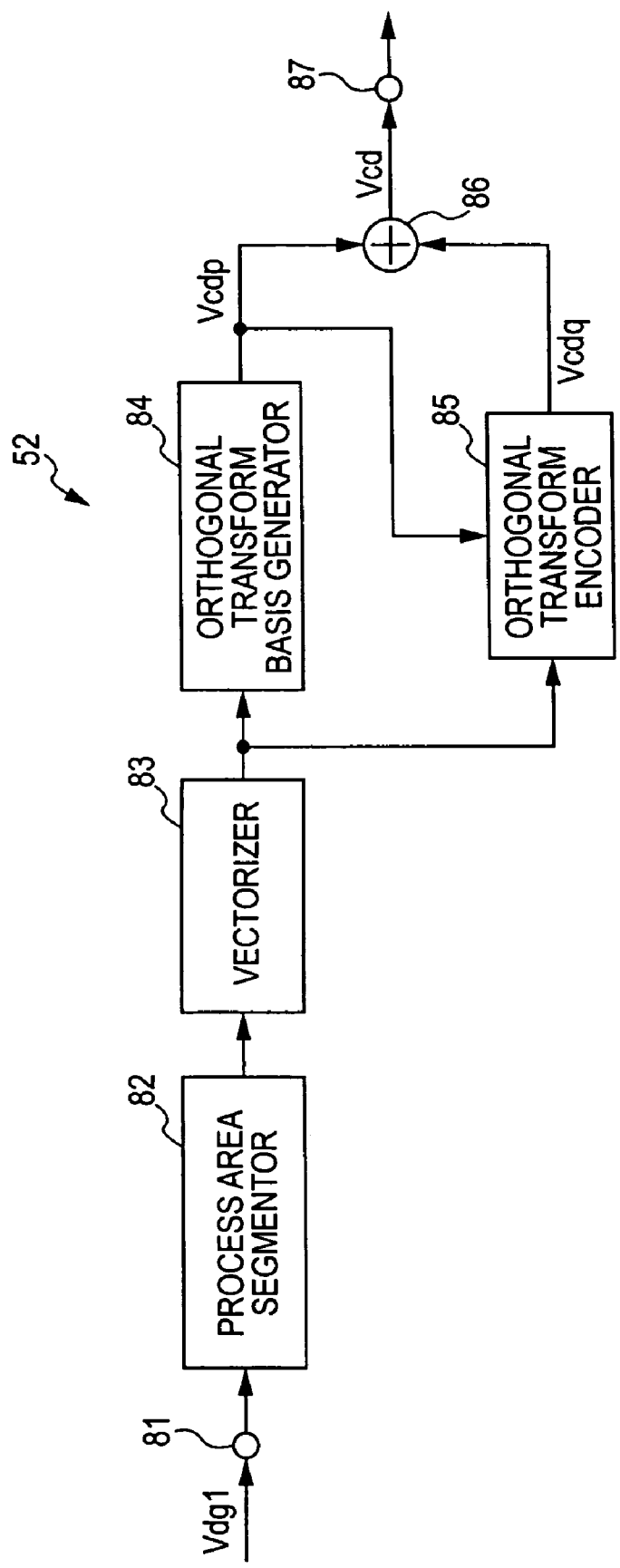
FIG. 3 is a block diagram of an encoder of the video processing system of FIG. 2.

FIG. 3 illustrates the encoder 52 performing the encoding process involving the main component analysis. As shown in FIG. 3, the encoder 52 includes an input unit 81 through an output unit 87.

The input unit 81 receives the digital video signal Vdg1 from the A/D converter 51, and supplies the digital video signal Vdg1 to the process area segmentor 82.

The process area segmentor 82 segments the digital video signal Vdg1 supplied from the input unit 81 into several blocks, and supplies the segmented blocks to the vectorizer 83. The blocks segmented by the process area segmentor 82 are referred to process areas.

The process area (block) is not limited to any particular size. Small block to be discussed later is not limited to any particular size, either.

The vectorizer 83 extracts M units of process data, each represented in N dimensions, from the process area to be processed out of the process areas supplied from the process area segmentor 82, vectorizes each of the extracted M units of process data, and supplies the resulting N-dimensional M vectors (hereinafter referred to as a process vector) to each of an orthogonal transform basis generator 84 and an orthogonal transform encoder 85.

The orthogonal transform basis generator 84 generates an N N-dimensional orthogonal bases by performing a main component analysis on the M N-dimensional process vectors supplied from the vectorizer 83 on a per process area basis, includes element values of N N-dimensional orthogonal bases, namely N×N element values, in a digital signal Vcdp, and supplies the resulting signal to each of the orthogonal transform encoder 85 and a superimposer 86.

The orthogonal transform basis generator 84 performs the following process in more detail.

The orthogonal transform basis generator 84 generates a matrix D having, as column elements, M N-dimensional process vectors supplied from the vectorizer 83, namely, the matrix D of N rows and M columns on a per process area basis. The orthogonal transform basis generator 84 decomposes the matrix D into element matrices U, X, and V, each satisfying equation (1) by performing a singular value decomposition on the matrix D:

$$D=U\Sigma V\sim \quad (1)$$

where the element matrix U represents a left singular matrix of N rows and N columns, the element matrix V represents a right singular matrix of M rows and M columns, and the element matrix $\Sigma$ represents a singular matrix having N rows and M columns. V~ represents the transpose of the element matrix V.

Let r represent the rank of the matrix D (r is an integer equal to or smaller than N), and each of the first r column elements of the element matrix U (left singular vector) is an orthogonal basis with the order of importance aligned from a left basis to a right basis. The first r column elements from of the element matrix U (the left singular vector), namely, an f-th vector of the r orthogonal basis vectors from the right (f is an integer from 1 through r) is referred to as a f-th main component. For simplicity of explanation, the rank of the matrix D is N. More specifically, N main components are obtained herein.

The orthogonal transform basis generator 84 includes the N×N element values forming the element matrix U of equation (1), namely, N×N coefficients, in the digital signal Vcdp, and supplies the resulting digital signal Vcdp to the orthogonal transform encoder 85 and the superimposer 86.

The orthogonal transform encoder 85 performs an axis transform process on each of the M N-dimensional process vectors supplied from the orthogonal transform basis generator 84 to convert the process area from a first coordinates system of the original N-dimension to a second coordinates system having N main components as an axis. More in detail, the orthogonal transform encoder 85 calculates equation (2):

$$Va=U\sim Vb \quad (2)$$

where Vb represents a matrix having N rows and a single column (column vector), and represents a predetermined one of the M N-dimensional process vectors supplied from the vectorizer 83, namely, the process vectors represented in the first coordinates system, and Va is a matrix of N rows and a single column (column vector), namely, the process vector represented in the second coordinates system. U~ represents the transpose of the element matrix U of equation (1), namely, the transpose of the element matrix U having the N×N coefficients as element values in the digital signal. Vcdp supplied from the orthogonal transform basis generator 84.

The orthogonal transform encoder 85 converts the M process vectors Vb into the M process vectors Va on a per process area basis, respectively.

The orthogonal transform encoder 85 performs the encoding process, in accordance with a predetermined encoding method, every M process vectors Va of one process area subsequent to conversion, includes the process result in the digital signal Vcdq and supplies the resulting signal to the superimposer 86.

The "predetermined encoding method" does not refer to any particular encoding method but refers to a encoding method simply adopted from a variety of encoding methods by the orthogonal transform encoder 85. The orthogonal transform encoder 85 can use any of a variety of encoding methods.

The orthogonal transform encoder 85 extracts an element value at an f-th row of each of the M process vectors Va subsequent to conversion (f is an integer from 1 through N), and arranges extracted M element values as pixel values in a predetermined order. The orthogonal transform encoder 85 thus generates a single digital video signal (block). The f-th row element value of the process vector Va (the element value at the f-th row from top in the column vector) refers to a coordinate value along the axis of the f main component (hereinafter f-th main component value). The block refers to a signal video signal having, as pixel values, the f-th main component values of the M process vectors Va subsequent to conversion. The block is hereinafter referred to as the f-th main component block.

The orthogonal transform encoder 85 generates N main component blocks, namely, a first main component block to N-th main component block.

The orthogonal transform encoder 85 quantizes each pixel value of the main component block to be processed (main component value) in each of the first main component block through the N-th main component block. For example, the following quantization methods can be adopted. In one quantization method, each pixel value forming a single main component block is divided by the same value in all of the first main component block through the N-th element block. In another quantization method, each pixel in a high-order main component block (meaning a smaller f of the f-th main component block) is divided by a value larger than a value used in the division of a low-order main component block.

The orthogonal transform encoder 85 performs code assignment process, such as Huffman code, on each of the pixels subsequent to quantization in each of the first main component block through the N-th main component block, and includes the process result in the digital signal Vcdq before supplying the resulting signal to the superimposer 86.

Alternatively, the orthogonal transform encoder 85 may perform the adaptive dynamic range coding (ADRC) process on each of the first main component block through the N-th main component block, and may supply, to the superimposer 86, the digital signal Vcdq with the process result contained therewithin. The ADRC coding method will be described later with reference to FIG. 12.

The series of processes performed by the orthogonal transform encoder 85 is referred to as an orthogonal transform encoding process. If the orthogonal transform encoding process is performed on one process area, the N orthogonal bases generated by the orthogonal transform basis generator 84 for the process area, namely, the N main components including the first main components through the N-th main components are used. The N main components including the first main components through the N-th main components for the one process area are collectively referred to as a basis for orthogonal transform.

The digital signal Vcdq provided by the orthogonal transform encoder 85 as a result of orthogonal transform encoding process is supplied to the superimposer 86. The superimposer 86 superimposes the digital signal Vcdp (a group of coefficients representing the basis for orthogonal transform every process area) supplied from the orthogonal transform basis generator 84 onto the digital signal Vcdq supplied from the orthogonal transform encoder 85. The superimposer 86 then supplies a resulting digital signal as an encoded digital video signal Vcd to the output unit 87.

The output unit 87 outputs the encoded digital video signal Vcd to the recorder 53 and the decoder 54 of FIG. 2.

Referring to FIGS. 4 through 12, the process area segmentor 82 and the orthogonal transform encoder 85 in the encoder 52 of FIG. 2 are further described below.

Figure 4:
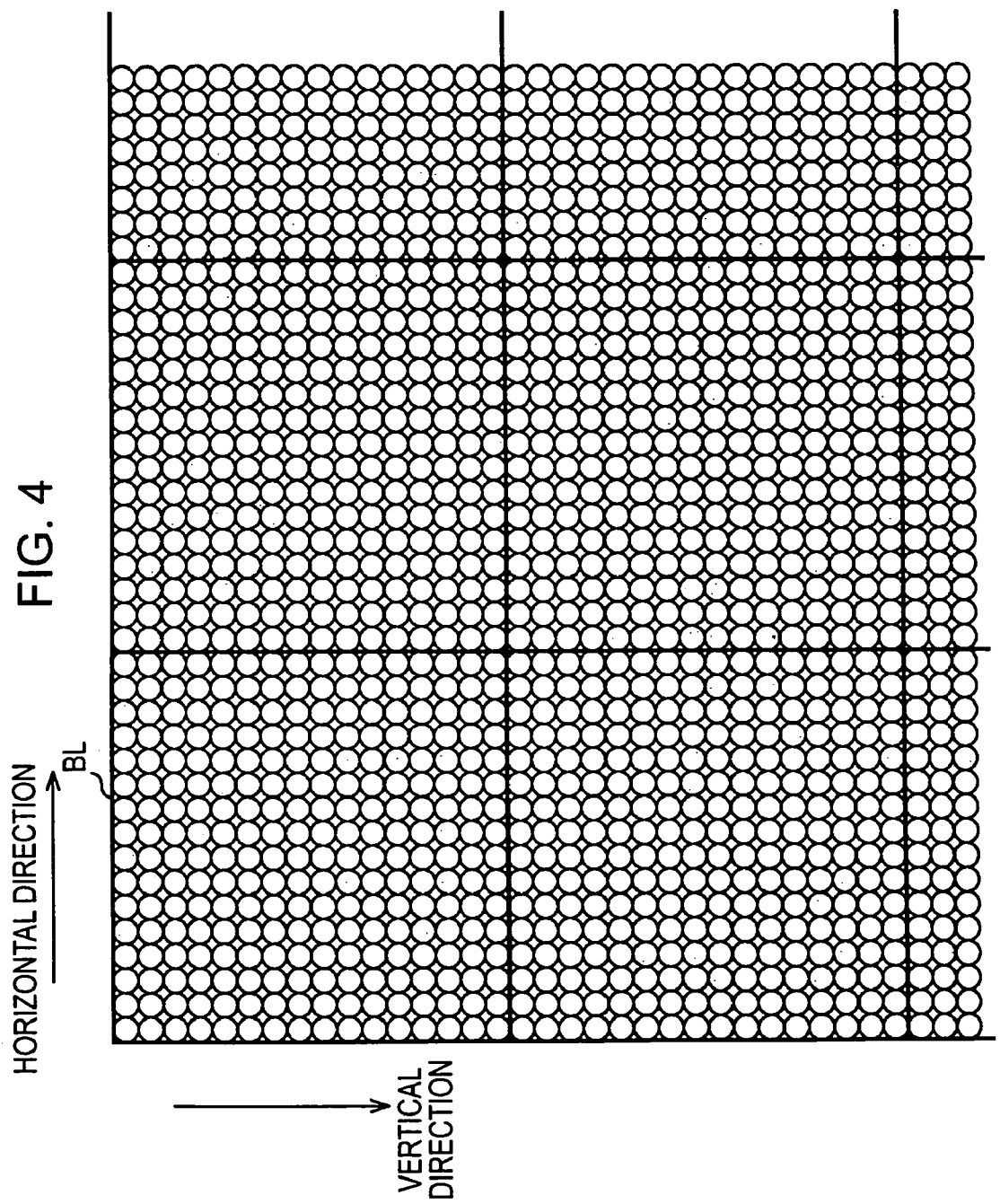
FIG. 4 illustrates a process of a process area segmentor of FIG. 3.

FIG. 4 illustrates the process result of the process area segmentor 82. More specifically, in accordance with the present embodiment, the process area segmentor 82 segments a video signal of one effective screen out of the digital video signal Vdg1 into process areas BL, each having a size equal to 16 pixels in a horizontal direction and 16 pixels in a vertical direction. A size having a h pixels in a horizontal direction and having v pixel in a vertical direction (h×v) is referred to as a size of h×v pixels. As shown in FIG. 4, the process area BL has a size of 16×16 pixels. Each blank circle represents pixel data forming a video signal of one effective screen area of the digital video signal Vdg1. The same is true of FIGS. 5 and 6.

FIGS. 5 through 8 illustrate three examples of a vector generation method in which the vectorizer 83 generates the process vector Vb (refer to equation (2)) using the process area BL.

A first vector generation method is described below.

In the first vector generation method, the vectorizer 83 further segments one process area BL into M small blocks. The vectorizer 83 generates the process vector Vb by substituting a pixel value of N pixel data units forming a small block to be processed for a predetermined one of N elements in each of the segmented small N blocks. The substitution destination per pixel value is not limited to any particular one.

Figure 5:
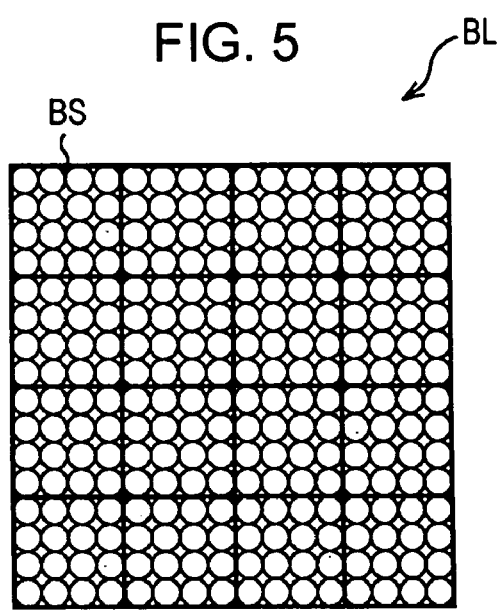
FIG. 5 illustrates a process of a vectorizer of FIG. 3.

In accordance with the present embodiment, the process area BL having a 16×16 pixel size is supplied from the process area segmentor 82 to the vectorizer 83. When the vectorizer 83 works in the first vector generation method, the vectorizer 83 segments the process area BL having a 16×16 pixel size into 16 small blocks BS, each having a 4×4 pixel size as shown in FIG. 5. In this case, N=M=16.

Figure 6:
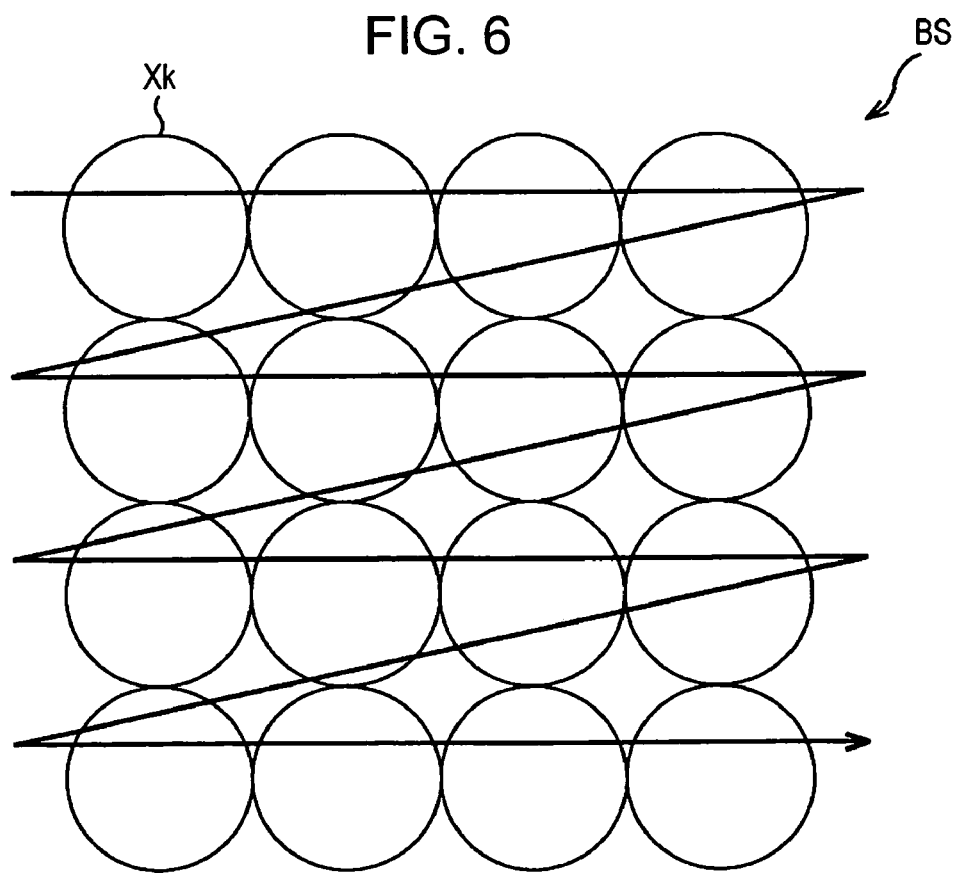
FIG. 6 illustrates the process of the vectorizer of FIG. 3.

As shown in FIG. 6, the vectorizer 83 extracts pixel values of 16 pixel data units forming the small block BS to be processed in an order of cluster from top left one, and arranges the pixel values in the order of extraction from top, thereby a process vector Vb (column vector) of 16-th dimension.

As shown in FIG. 6, let Xk represent the value of k-th pixel data in the cluster order from top left (k is an integer from 1 through N, N=16 in the case of FIG. 16) in the pixel data forming the small block BS. If it is not necessary to discriminate pixel data from the value thereof, the pixel data and the value thereof are collectively referred to as a pixel value. More specifically, the small block BS of FIG. 6 is composed of a pixel value X1 through a pixel value X16. In this case, the vectorizer 83 generates 16-dimensional process vector Vb (matrix Vb of 16 rows and a single column) represented by equation (3), and supplies the generated process vector Vb to the orthogonal transform basis generator 84 and the orthogonal transform encoder 85:

$$Vb = \begin{bmatrix} X1 \\ X2 \\ \vdots \\ X15 \\ X16 \end{bmatrix} \quad (3)$$

More specifically, the vectorizer 83 generates 16 16-dimensional process vectors Vb represented by equation (3), and supplies the generated 16 16-dimensional process vectors Vb to the orthogonal transform basis generator 84 and the orthogonal transform encoder 85.

The orthogonal transform basis generator 84 generates the element matrix U of 16 rows and 16 columns in accordance with equation (1). Although equation (1) does not show, 16 column elements forming the element matrix U respectively represent the first main component through the 16-th main component. In other words, the element matrix U represents the basis of orthogonal transform for a single process area BL.

The orthogonal transform encoder 85 converts the 16 process vectors Vb represented by equation (3) (represented by the first coordinates system having each pixel value as an axis) in one process area BL into the process vectors Va represented by the second coordinates system having, as axes, the first main component through the 16-th main component in accordance with equation (2). More specifically, if the f-th main component value is represented by Xf, the 16 16-dimensional process vectors Vb represented by equation (3) are respectively converted into 16 16-dimensional process vectors Va represented by the following equation (4):

$$Va = \begin{bmatrix} X1' \\ X2' \\ \vdots \\ X15' \\ X16' \end{bmatrix} \quad (4)$$

In this case, the orthogonal transform encoder 85 extracts the element value Xf at the f-th row of the 16 process vectors Va subsequent to conversion represented by equation (4), namely, the f-th main component value Xf, and arranges the 16 extracted f-th main component values Xf as pixel values in the order of arrangement of the small block BS of FIG. 5, thereby generating the f-th main component block having a 4×4 pixel size. The orthogonal transform encoder 85 thus generates the first element block through the 16-th element block, each having a 4×4 pixel size. The orthogonal transform encoder 85 performs the encoding process in accordance with an appropriate encoding method on each of the first element block through the 16-th element block, includes the process result in the digital signal Vcdq, and then supplies the resulting digital signal Vcdq to the superimposer 86.

The first one of the three vector generation methods has been discussed. The second one of the three vector generation methods is described below.

In the first vector generation method, only one type of pixel data (pixel value) is used for one pixel. In the second vector generation method, a plurality of types of video data (pixel values) is used for one pixel.

More specifically, digital video signals of a color image may be component signals including a signal representing a red luminance level (hereinafter referred to as R signal), a signal representing a green luminance level (hereinafter referred to as G signal), and a signal representing a blue luminance level (hereinafter referred to as B signal). The video data of one pixel forming the digital video signal includes pixel data representing a red luminance value (hereinafter referred to as R pixel value), pixel data representing a green luminance value (hereinafter referred to as G pixel value), and pixel data representing a blue luminance value (hereinafter referred to as B pixel value).

In such a case, the second vector generation method is applicable.

In the second vector generation method, the vectorizer 83 segments one process area BL into M small blocks. It should be here noted that each unit of pixel data forming one small block extracted in the first vector generation method is indicative of one pixel value (or considered to be indicative of one pixel value) while each unit of pixel data forming one small block extracted in the second vector generation method contains data indicative of the R pixel value, the G pixel value, and the B pixel value.

Figure 7:
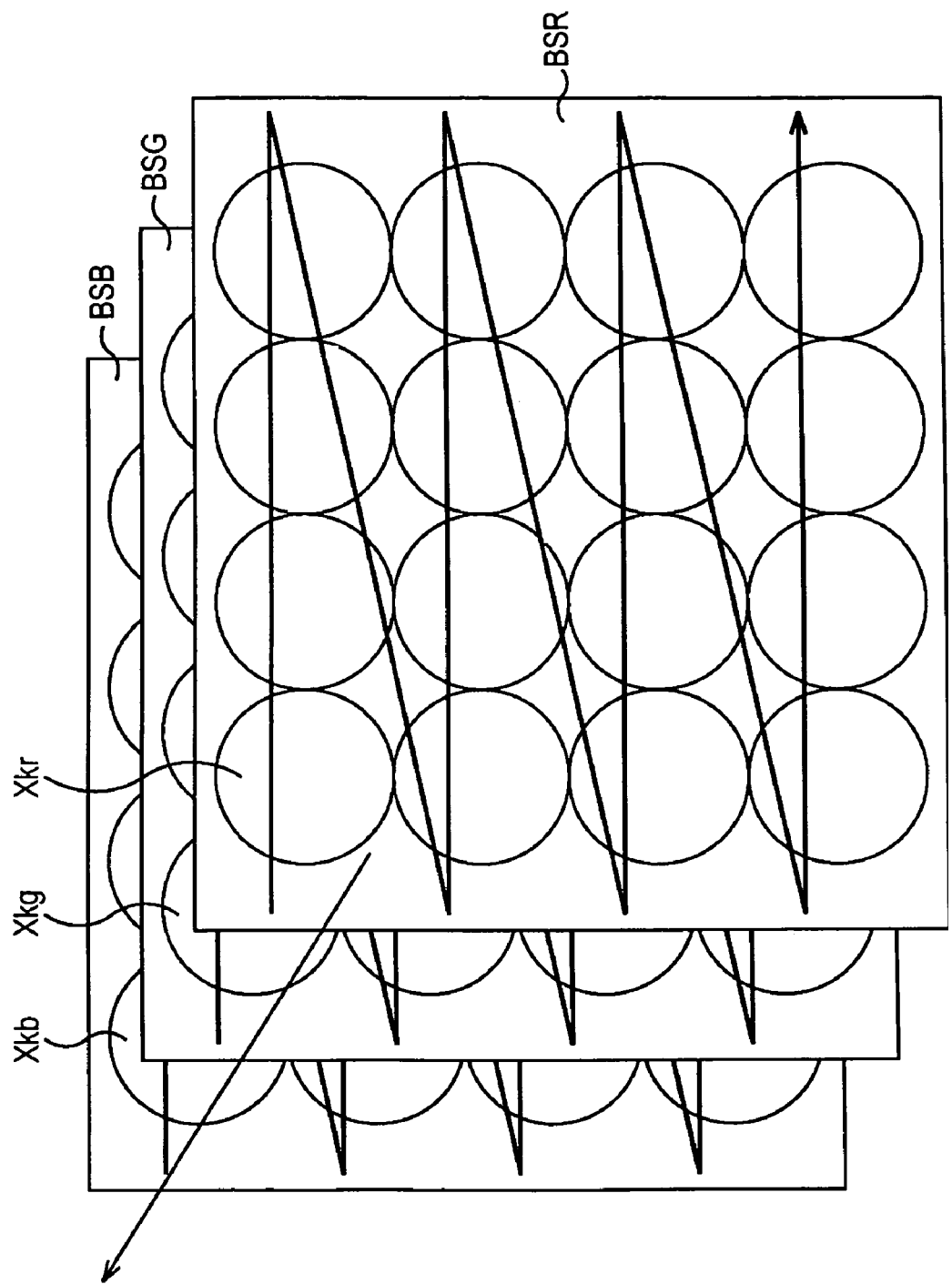
FIG. 7 illustrates the process of the vectorizer of FIG. 3.

The one small block BS of FIG. 6 is obtained in the first vector generation method while three small blocks BSR, BSG, and BSB of FIG. 7 are obtained in the second vector generation method. In other words, the small block BS of the color image is composed of three small blocks BSR, BSG, and BSB.

As shown in FIG. 7, the small block BSR is a small block having a 4×4 pixel size composed of pixel data showing R pixel values only. The small block BSG is a small block having a 4×4 pixel size composed of pixel data showing G pixel values only. The small block BSB is a small block having a 4×4 pixel size composed of pixel data showing B pixel values only. As shown in FIG. 7, a blank circle in the small block BSR denotes pixel data meaning an R pixel value, a blank circle in the small block BSG denotes pixel data meaning a G pixel value, and a blank circle in the small block BSB denotes pixel data meaning a B pixel value.

As in the illustration of FIG. 7, the R pixel value at k-th pixel in the order of cluster from top left in the R pixel data forming the small block BSR is represented by Xkr, the G pixel value at k-th pixel in the order of cluster from top left in the G pixel data forming the small block BSG is represented by Xkg, and the B pixel value at k-th pixel in the order of cluster from top left in the B pixel data forming the small block BSB is represented by Xkb. If there is no need for discriminating pixel data from the pixel value thereof, the pixel data and the pixel value thereof are collectively referred to as a pixel value. In the example of FIG. 7, the small block BSR is composed of R pixel value X1r through R pixel value X16r, the small block BSG is composed of G pixel value X1g through G pixel value X16g, and the small block BSB is composed of B pixel value X1b through B pixel value X16b.

Figure 8:
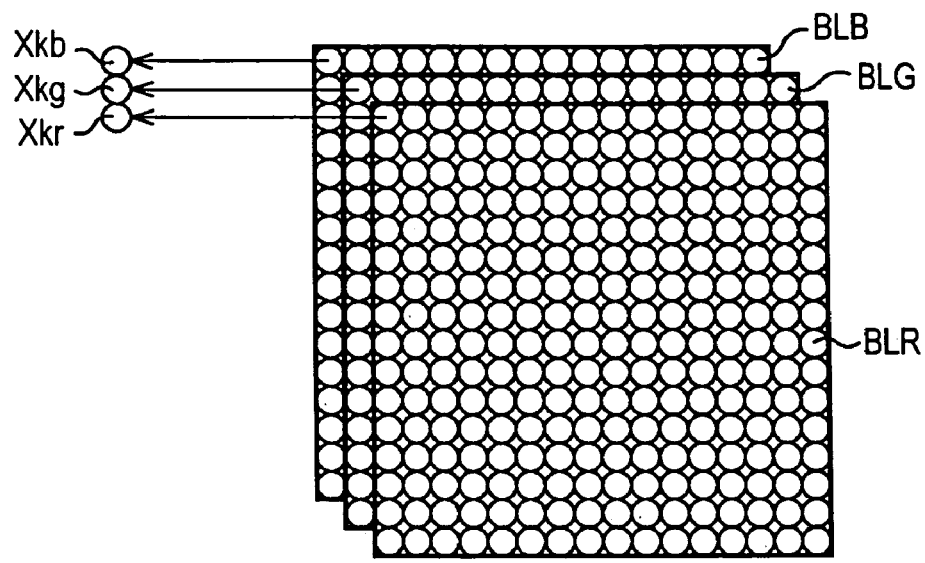
FIG. 8 illustrates the process of the vectorizer of FIG. 3.

The above discussion of FIG. 7 is also applied to FIG. 8.

In the second vector generation method, the vectorizer 83 handles the small blocks BSR, BSG, and BSB as a unit to be processed as show in FIG. 7, and extracts 16 R pixel values X1r through X16r forming the small block BSR to be processed in the order of cluster from top left. The vectorizer 83 extracts 16 G pixel values X1g through X16g forming the small block BSG to be processed in the order of cluster from top left, and extracts 16 B pixel values X1b through X16b forming the small block BSB to be processed in the order of cluster from top left. The vectorizer 83 generates a 48-dimensional process vector Vb (column vector).

More specifically, the vectorizer 83 generates the 48-dimensional process vector Vb (of 48 rows and one column) represented by equation (5), and then supplies the resulting process vector Vb to the orthogonal transform basis generator 84 and the orthogonal transform encoder 85:

$$Vb = \begin{bmatrix} X1r \\ \vdots \\ X16r \\ X1g \\ \vdots \\ X16g \\ X1b \\ \vdots \\ X16b \end{bmatrix} \quad (5)$$

More specifically, the vectorizer 83 generates 16 48-dimensional process vectors Vb represented by equation (5) for each process area BL illustrated in FIG. 5, and supplies the 16 48-dimensional process vector Vb to the orthogonal transform basis generator 84 and the orthogonal transform encoder 85.

In accordance with equation (1), the orthogonal transform basis generator 84 generates the element matrix U of 48 rows and 48 columns. Although not represented in equation (1), the 48-column elements forming the element matrix U respectively represent the first main component through the 48-th main component. More specifically, the element matrix U shows orthogonal basis of one process area BL.

The orthogonal transform encoder 85 converts the 16 process vectors Vb represented by equation (5) in one process area BL (represented by a first coordinates system having, as axes thereof, the R pixel values, the G pixel values, and the B pixel values) into the process vectors Va represented by a second coordinates system having, as axes thereof, the first main component through the 48-th main component in accordance with equation (2). More specifically, let Xf' represent an f-th main component, and the 16 48-dimensional process vectors Vb represented by equation (5) are converted into the 16 48-dimensional process vectors Va represented by equation (6):

$$Va = \begin{bmatrix} X1' \\ X2' \\ \vdots \\ X47' \\ X48' \end{bmatrix} \quad (6)$$

In this case, the orthogonal transform encoder 85 extracts the element values Xf' at the f-th row of the converted 16 process vectors Va represented by equation (6), namely, the f-th main component values Xf', and arranges the extracted 16 f-th main component values Xf' as respective pixel values in the small block BS of FIG. 5. The orthogonal transform encoder 85 thus generates the f-th main component block of 4×4 pixel size. For example, the orthogonal transform encoder 85 generates the first main component block through the 48-th main component block, each having a 4×4 pixel size. The orthogonal transform encoder 85 performs the encoding process of an appropriate encoding method on each of the first main component block through the 48-th main component block, includes the encoded blocks in the digital signal Vcdq, and supplies the resulting digital signal Vcdq to the superimposer 86.

The first vector generation method and the second vector generation method have been discussed. The third vector generation method is now described.

In the third vector generation method, a plurality of types of pixel data is used for one pixel. For each pixel, a process vector Vb is generated containing a plurality of types of pixel values.

For example, in the third vector generation method, an R pixel value, a G pixel value, and a B pixel value are arranged from top on a per pixel basis to generate a process vector Vb (column vector). In other words, in the third vector generation method, the second vector generation method is applied to a small block having a size of a single pixel.

More specifically, the process area BL of 48×48 pixel size of FIG. 4 is now supplied from the process area segmentor 82 to the vectorizer 83 of FIG. 3. As shown in FIG. 8, the process area BL is composed of three large blocks BLR, BLG, and BLB.

As shown in FIG. 8, a large block BLR is a block containing 48×48 pixels having R pixel values only. The large block BLG is a block containing 48×48 pixels having G pixel values only. The large block BLB is a block containing 48×48 pixels having B pixel values only. In other words, the large block BLR is composed of R pixel values X1r through X48r, the large block BLG is composed G pixel values X1g through X48g, and the large block BLB is composed of B pixel values X1b through X48b.

In the third vector generation method, the vectorizer 83 extracts an R pixel value Xkr, a G pixel value Xkg, and a B pixel value Xkb at k-th pixel in the order of cluster from top left from the process areas BLR, BLG, and BLB, each having a size of 48×48 pixels, and arranges the pixel values in the order of extraction, thereby generating a three-dimensional process vector Vb (column vector) represented by equation (7):

$$Vb = \begin{bmatrix} Xkr \\ Xkg \\ Xkb \end{bmatrix} \quad (7)$$

More specifically, the vectorizer 83 generates 48 three-dimensional process vectors Vb (equal to the number of pixels in the process area BL) represented by equation (7) for one process area BL illustrated in FIG. 5 (a block group composed of three large blocks BLR, BLG, and BLG of FIG. 8), and supplies the generated process vectors Vb to the orthogonal transform basis generator 84 and the orthogonal transform encoder 85.

In accordance with equation (1), the orthogonal transform basis generator 84 generates the element matrix U of 3 rows and 3 columns. In other words, an element matrix U represented by the following equation (8) is generated:

$$U = \begin{bmatrix} a_{00} & a_{10} & a_{20} \\ a_{01} & a_{11} & a_{21} \\ a_{02} & a_{12} & a_{22} \end{bmatrix} \quad (8)$$

The three column elements forming the element matrix U represented by equation (8) represent a first main component through a third main component. Let s represent the first element, t represent the second element, and u represent the third element, and the first through third element are expressed by the following equations (9) through (11):

$$s = \begin{bmatrix} a_{00} \\ a_{01} \\ a_{02} \end{bmatrix} \quad (9)$$

$$t = \begin{bmatrix} a_{10} \\ a_{11} \\ a_{12} \end{bmatrix} \quad (10)$$

$$u = \begin{bmatrix} a_{20} \\ a_{21} \\ a_{22} \end{bmatrix} \quad (11)$$

The orthogonal transform encoder 85 sets each of the 48 pixels forming one process area BL as a target pixel, and converts a process vector Vb of the target pixel represented by equation (8) (represented by the first coordinates system having, as axes, the R pixel value, the G pixel value, and the B pixel value) into a process vector Va of the target pixel represented by the second coordinates system having, as axes, the first through third main components in accordance with equation (2). The transpose U~ of the element matrix U of equation (2) is expressed in the following equation (12):

$$U^{\sim} = \begin{bmatrix} a_{00} & a_{01} & a_{02} \\ a_{10} & a_{11} & a_{12} \\ a_{20} & a_{21} & a_{22} \end{bmatrix} \quad (12)$$

When a k-th pixel in the order of cluster from top left in the process area BL is a target pixel, the first main component value of the target pixel is represented by Xks, the second main component value of the target pixel is represented by Xkt, and the third main component value of the target pixel is represented by Xku. The process vector Vb of the target pixel represented by equation (7) is converted into the process vector Va of the target pixel represented by the following equation (13):

$$Va = \begin{bmatrix} Xks \\ Xkt \\ Xku \end{bmatrix} \quad (13)$$

Figure 9:
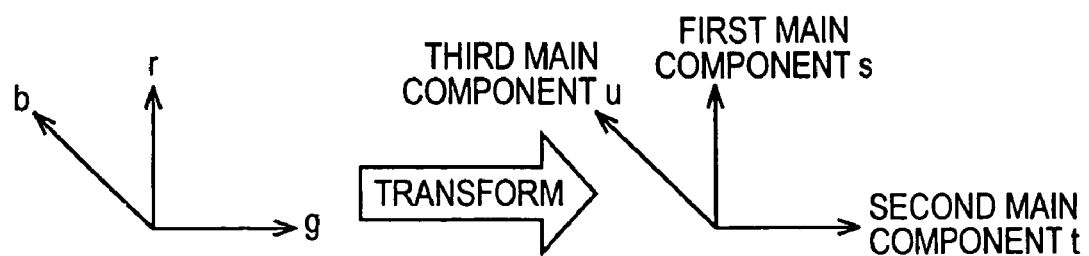
FIG. 9 illustrates a process of an orthogonal transform basis generator and an orthogonal transform encoder of FIG. 3.

The process vector Vb represented by equation (17) is a vector represented by the first coordinates system shown in the left portion of FIG. 9. In the first coordinates system shown in the left portion of FIG. 9, an axis r represents the axis of an r pixel value, an axis g represents the axis of a g pixel value, and an axis b represents the axis of a b pixel value. In contrast, the converted process vector Va represented by equation (13) is a vector represented by the second coordinates system shown in the right portion of FIG. 9. In the second coordinates system shown in the right portion of FIG. 9, an axis of a first main component s is the axis having, as a basis, the vector represented by equation (9), an axis of a second main component t is the axis having, as a basis, the vector represented by equation (10), and an axis of a third main component u is the axis having, as a basis, the vector represented by equation (11).

If the k-th pixel in the order of cluster from top left in the process area BL is a target pixel, the process vector Vb represented by equation (7) is one of expression format relating to a color of the target pixel, and relating to a point in space defined by the first coordinates system illustrated in the left portion of FIG. 9. In contrast, the converted process vector Va represented by equation (13) is another expression format relating to a color of the target pixel, and relating to a point in another space defined by the second coordinates system illustrated in the left portion of FIG. 9.

The main component analysis has been discussed in view of the equations. The main component analysis is now described from a different angle. If M points are distributed in an N-dimensional space, a method of generating orthogonal axes describing most efficiently the M points is the main component analysis. The "orthogonal axes describing most efficiently the M points" are the axes of the above-mentioned main components.

From the above-mentioned standpoint, the main component analysis is performed through the following first through fourth steps.

In the first step, position vectors at the M points distributed in the N-dimensional space are averaged, and then a difference vector between each of the M points and the mean value thereof is calculated.

In the second step, a vector maximizing the sum of squares of the scalar products with the difference vectors is determined. The vector determined in the second step describes most appropriately the degree of scatter of the M points distributed in the N-dimensional space. In other words, the vector determined in the second step is the above-mentioned first main component.

In the third step, from among the vectors orthogonalizing the first main component, a vector maximizing the sum of the scalar products of the difference vectors is determined as a second main component.

In the fourth step, the third step is iterated to determine a third main component through N-th main component.

A color space (hereinafter referred to as RGB space) defined by the first coordinates system illustrated in the left portion of FIG. 9 is present as a "color space representing a color group of the 48 pixels in the process area BL" of FIG. 4. When the main component analysis is performed on the 48 points representing the colors of the 48 pixels distributed in the RGB space (the process vector Vb represented by equation (7)), a color space defined by the second coordinates system illustrated in the right portion of FIG. 9 is determined as an optimum space (optimum color space) from among the "color spaces representing the color group of the 48 pixels in the process area BL" representing the colors of the 48 pixels. The 48 points representing the colors of the 48 pixels distributed in the RGB space (the process vector Vb represented by equation (7)), namely, the 48 points as a result of re-distributed in the optimum color space, are expressed by the converted process vector Va represented by equation (13).

The process vector Vb generated in the first vector generation method and defined by equation (3) has the following meaning. A first space (hereinafter small block space) having, as an axis, each of the pixel values X1 through X16 forming one small block BS is present as a "space representing 16 small blocks BS in the process area BL" of FIG. 5. In this case, 16 points distributed in the small block are represented by the process vector Vb defined by equation (3). When the main component analysis is performed on the 16 points distributed in the small block space, an optimum space of the "spaces representing 16 small blocks in the process area BL" (hereinafter after optimum small block) is determined as a space defined by the second coordinates system having, as axes, the first main component through the 16-th main component. The 16 points distributed in the small space (the process vector Vb defined by equation (3)), namely, the 16 points-obtained as a result of redistribution in the optimum small block, is represented by the converted process vector Va defined by equation (4).

As described above, the orthogonal transform encoder 85 generates the converted 48 process vectors Va defined by equation (13), namely, the 48 process vectors Va re-expressed by the "color space representing the color group of the 48 pixels in the process area BL".

Figure 10:
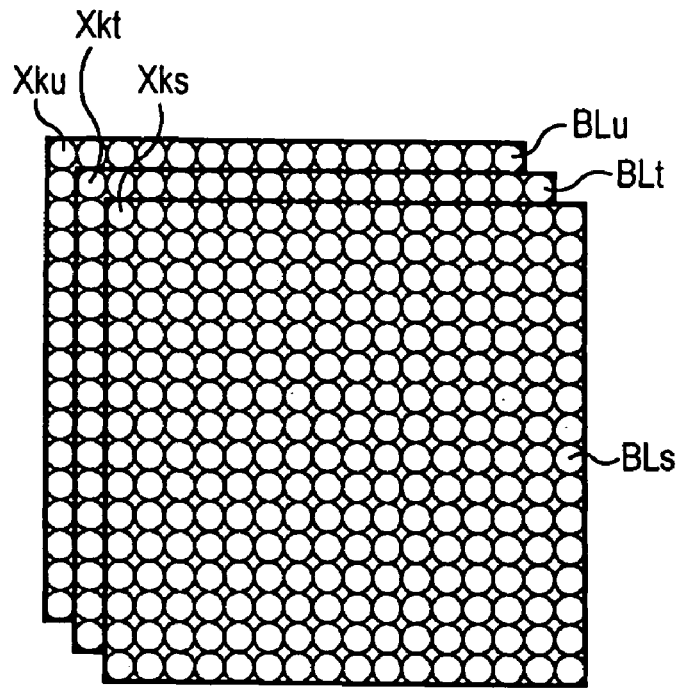
FIG. 10 illustrates a process of the orthogonal transform basis generator and the orthogonal transform encoder of FIG. 3.

The orthogonal transform encoder 85 generates a first main component block BLs, a second main component block BLt, and a third main component block BLu as shown in FIG. 10.

The orthogonal transform encoder 85 extracts element values Xks of the 48 process vectors Vb at a first row, namely, first element values Xks, and arranges the extracted 48 first main component values Xks in locations corresponding to the pixel positions of the process area BL of FIG. 4 (at k-th position in the order of cluster from top left), thereby generating the first main component block BLs having a size of 16×16 pixels.

The orthogonal transform encoder 85 extracts element values Xkt of the 48 process vectors Vb at a second row, namely, second element values Xkt, and arranges the extracted 48 second main component values Xkt in locations corresponding to the pixel positions of the process area BL of FIG. 4 (at k-th position in the order of cluster from top left), thereby generating the second main component block BLt having a size of 16×16 pixels.

The orthogonal transform encoder 85 extracts element values Xku of the 48 process vectors Vb at a third row, namely, third element values Xku, and arranges the extracted 48 third main component values Xku in locations corresponding to the pixel positions of the process area BL of FIG. 4 (at k-th position in the order of cluster from top left), thereby generating the third main component block BLu having a size of 16×16 pixels.

The orthogonal transform encoder 85 performs the encoding process of an appropriate encoding method on the first main component block BLs, the second main component block BLt, and the third main component block BLu, includes the encoded blocks in the digital signal Vcdq, and supplies the resulting digital signal to the superimposer 86. The encoding result responsive to the first main component block. BLs is referred to as a first main component code, the encoding result responsive to the second main component block BLt is referred to as a second main component code, and the encoding result responsive to the third main component block BLu is referred to as a third main component code. The digital signals Vcdq of FIG. 11 (one process area BL), generated by the orthogonal transform encoder 85, are supplied to the superimposer 86.

Figure 12:
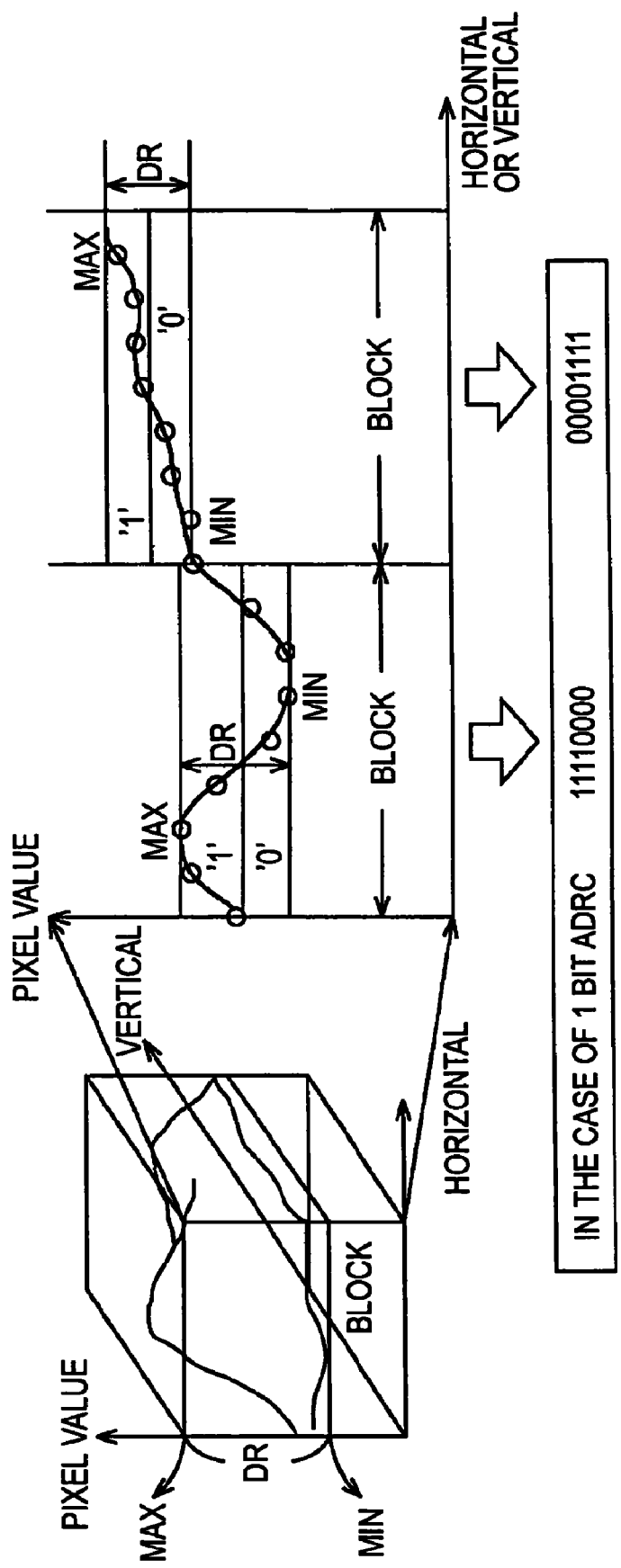
FIG. 12 illustrates ADRC as one encoding technique applicable to the orthogonal transform encoder of FIG. 3.

The encoding method performed by the orthogonal transform encoder 85 is not limited to any particular one. For example, the ADRC method may be used. As shown in FIG. 12, the ADRC method is outlined below.

The distribution of pixel values (signal levels) in a predetermined block is shown in the left portion of FIG. 12. As shown, the axis extending from left to right is a horizontal axis, the axis extending upwardly and rightward at a slant angle is a vertical axis, and the axis extending upwardly is an axis of pixel value.

A graph illustrated in the right portion of FIG. 12 represents pixel values contained in the blocks illustrated in the left portion of FIG. 12, arranged in the order of cluster in the horizontal direction or the vertical direction. In this graph, the axis extending from left to right is the horizontal axis or the vertical axis, and the axis extending upward is the axis of pixel value. Each blank circle represents one pixel. In each block of FIG. 12, pixel data of eight pixels (pixel values) is arranged in the horizontal direction or vertical direction.

The maximum one and the minimum one of the pixel values of the eight pixels consecutively arranged in the horizontal direction or the vertical direction are denoted by MAX and MIN, respectively. As shown in FIG. 12, dynamic range is defined by DR=MAX−MIN+1, and each pixel value is re-quantized into the number of bits (1 bit in FIG. 12) smaller than the original number of bits (8 bits, for example). Such an encoding method is referred to as ADRC method.

More specifically, in the ADRC method for re-quantizing to 1 bit as shown in FIG. 12, the pixel value per pixel is compared with a threshold value (bisectrix of the dynamic range in FIG. 12). If the pixel value is equal to or higher than the threshold value, a code "1" is assigned to the pixel, and if the pixel value is lower than the threshold value, a code "0" is assigned to the pixel.

More specifically, in the right portion of FIG. 12, the values of the first through fourth pixels from the left side are above the threshold value while the values of the fifth through eighth pixels are below the threshold value. The values of the first through eighth pixels from the left side are replaced with 1, 1, 1, 1, 0, 0, 0, and 0, respectively. The values of the ninth through twelfth pixels from the left side are below the threshold value while the values of thirteenth through sixteenth pixels are above the threshold value. As shown in FIG. 12, the values of the ninth through sixteenth pixels are replaced with 0, 0, 0, 0, 1, 1, 1, and 1, respectively.

It should be noted that the ADRC method allows a variable length code to be output in response to a dynamic range, namely, that the number of quantization bits is selected based on the magnitude of the dynamic range. The smaller the dynamic range, the smaller number of bits is used in re-quantization. With quantization distortion reduced, the redundancy of the pixel value is removed and the amount of data is minimized.

Figure 11:
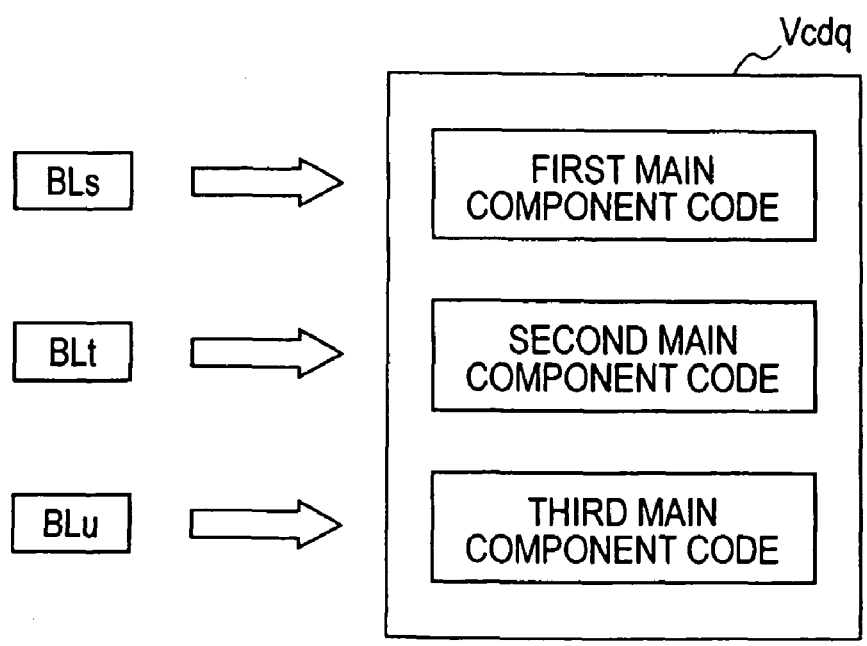
FIG. 11 illustrates a process of the orthogonal transform basis generator and the orthogonal transform encoder of FIG. 3.

As shown in FIGS. 10 and 11, the orthogonal transform encoder 85 performs the encoding process of the ADRC method on each of the first main component block BLs, the second main component block BLt, and the third main component block BLu. Using the property of the ADRC method, the orthogonal transform encoder 85 can change the number of quantization bits in each of the first main component block BLs, the second main component block BLt, and the third main component block BLu. More specifically, in the main component analysis, most power is concentrated on the first main component, next most power applied on the second main component, and less power applied on the third main component. The magnitudes of the dynamic ranges of the blocks are the first main component block BLs, the second main component block BLt, and the third main component block BLu in the magnitude order from large to small. The orthogonal transform encoder 85 sets the number of quantization bits of the first main block BLs to the largest (to 3 bits, for example), the number of quantization bits of the second main block BLt to the second largest (to 2 bits, for example), and the number of quantization bits of the third main block BLu to the smallest (to 1 bit, for example).

As previously described, the encoding method of the orthogonal transform encoder 85 is not limited to any particular one. However, since power is concentrated on the first main component in the main component analysis, the use of an encoding method that permits information to remain in the first main component block BLs, more specifically, the use of the ADRC method, is more preferable.

The structure of the encoder 52 of FIG. 3 has been discussed. The encoding process of the encoder 52 of FIG. 3 is discussed with reference to a flowchart of FIG. 13.

In step S41, the input unit 81 inputs one frame of digital video signal Vdg1, for example. When one frame digital video signal Vdg1 is supplied from the input unit 81 to the process area segmentor 82, processing proceeds to step S42.

In step S42, the process area segmentor 82 segments the one frame of digital video signal Vdg1. More specifically, the one frame of digital video signal Vdg1 is segmented into a plurality of process areas. When the plurality of process areas in one frame is supplied from the process area segmentor 82 to the vectorizer 83, processing proceeds to step S43.

In step S43, the vectorizer 83 extracts M units of process data represented N dimensions from a process area to be processed out of the process areas into which the one frame of digital video signal Vdg1 is segmented in step S42. The vectorizer 83 vectorizes the M units of process data. Through the process in step S43, M process vectors Vb (see equation (2)) are obtained per process area, and then supplied to the orthogonal transform basis generator 84 and the orthogonal transform encoder 85. Processing proceeds to step S44.

In step S44, the orthogonal transform basis generator 84 adaptively generates the basis of orthogonal transform of the process area to be processed out of the process areas into which the one frame of digital video signal Vdg1 is segmented in step S42, i.e., generates the first main component through the N-th main component. Through the process in step S44, the basis of orthogonal transform is obtained on a per process area basis, and then included into the digital signal Vcdp. If the resulting digital signal Vcdp is the supplied to the orthogonal transform encoder 85 and the superimposer 86, in other words, if the one frame of digital signal Vcdp is supplied to the orthogonal transform encoder 85 and the superimposer 86, processing proceeds to step S45.

In step S45, the superimposer 86 performs the orthogonal transform encoding process on the M N-dimensional process vectors Vb for the process area to be processed, using the basis of orthogonal transform in the process area to be processed, out of the process areas into which the one frame of digital video signal Vdg1 is segmented in step S42.

Through the process in step S45, the result of orthogonal transport encoding process of one frame is included in the digital signal Vcdq, and the resulting digital signal Vcdq is supplied from the orthogonal transform encoder 85 to the superimposer 86. Processing proceeds to step S46.

In step S46, the superimposer 86 generates the encoded digital video signal Vcd by superimposing the one frame of digital signal Vcdp output from the orthogonal transform basis generator 84 in step S44 onto the one frame of digital signal Vcdq output from the orthogonal transform encoder 85 in step S45.

When the encoded digital video signal Vcd is output from the superimposer 86 to the output unit 87, processing proceeds to step S47. In step S47, the output unit 87 outputs the encoded digital video signal Vcd to the outside.

In step S48, the encoder 52 determines whether all frames to be processed have been processed.

If it is determined in step S48 that all frames have not been processed, in other words, if the answer to the determination in step S48 is no, processing returns to step S41 to repeat step S41 and subsequent steps. More specifically, a next one frame digital video signal Vdg1 of is input in step S41, the above-referenced encoding process is performed in steps S42 through S46, and one frame of encoded digital video signal Vcd of is thus obtained as a result. The encoded digital video signal Vcd is output in step S47.

Figure 13:
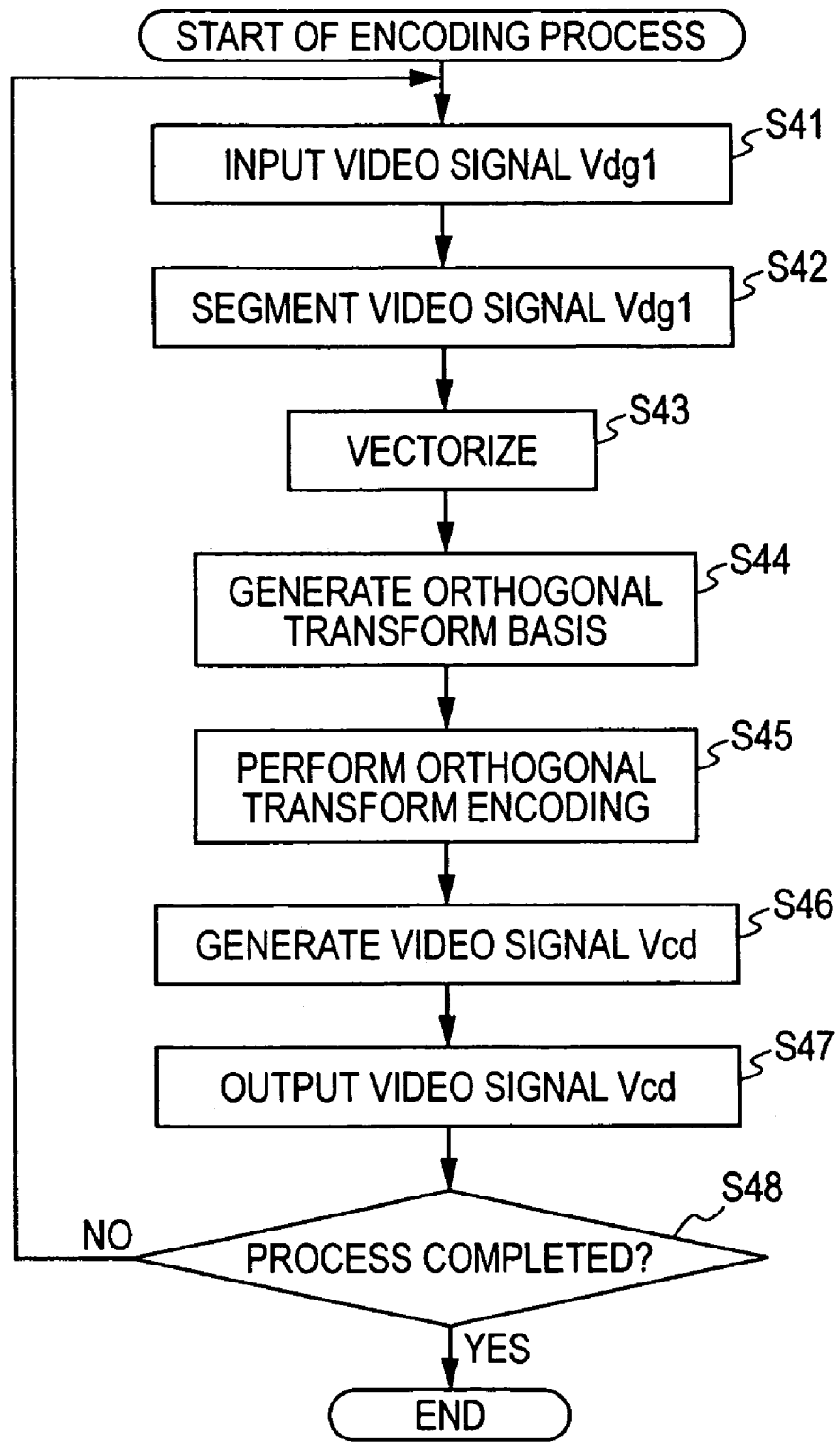
FIG. 13 is a flowchart illustrating an encoding process of the encoder of FIG. 3.

A loop process in steps S41 through S48 is performed to process all frames. When last frame of encoded digital video signal Vcd is output, the answer to the determination in step S48 is yes, and the encoding process of FIG. 13 is thus completed.

The encoding process of the encoder 52 of FIG. 3 has been discussed with reference to FIG. 13.

With reference to FIGS. 14 through 17, the decoder 54 of one embodiment of the present invention, corresponding to the encoder 52 of FIG. 3, is described below.

Figure 14:
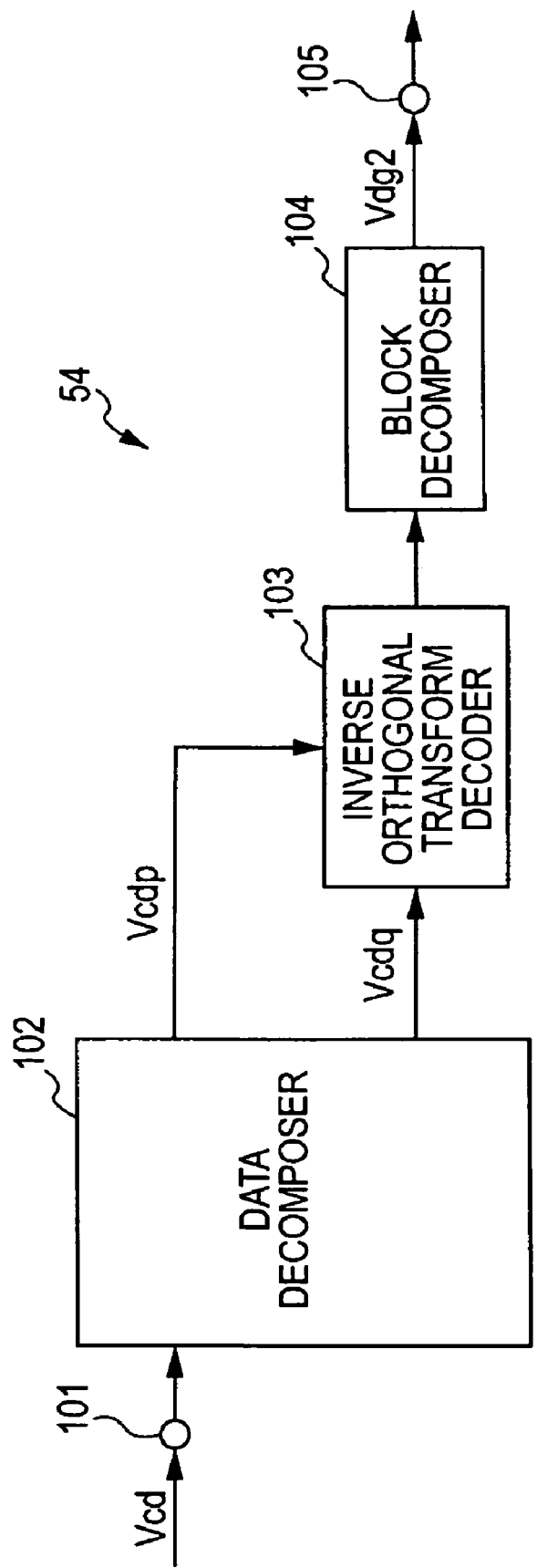
FIG. 14 is a block diagram illustrating a decoder corresponding to the encoder of FIG. 3 in the video processing system of FIG. 2.

FIG. 14 illustrates the decoder 54 corresponding to the encoder 52 of FIG. 3. As shown in FIG. 14, the decoder 54 includes an input unit 101 through an output unit 105.

Upon receipt of the encoded digital video signal Vcd output from the encoder 52 of FIG. 3, the input unit 101 supplies the encoded digital video signal Vcd to the data decomposer 102.

The data decomposer 102 decomposes the encoded digital video signal Vcd into the digital signal Vcdp output from the orthogonal transform basis generator 84 of FIG. 3 and the digital signal Vcdq output from the orthogonal transform encoder 85 of FIG. 3, and then supplies the digital signal Vcdp and the digital signal Vcdq to the inverse orthogonal transform decoder 103.

Figure 15:
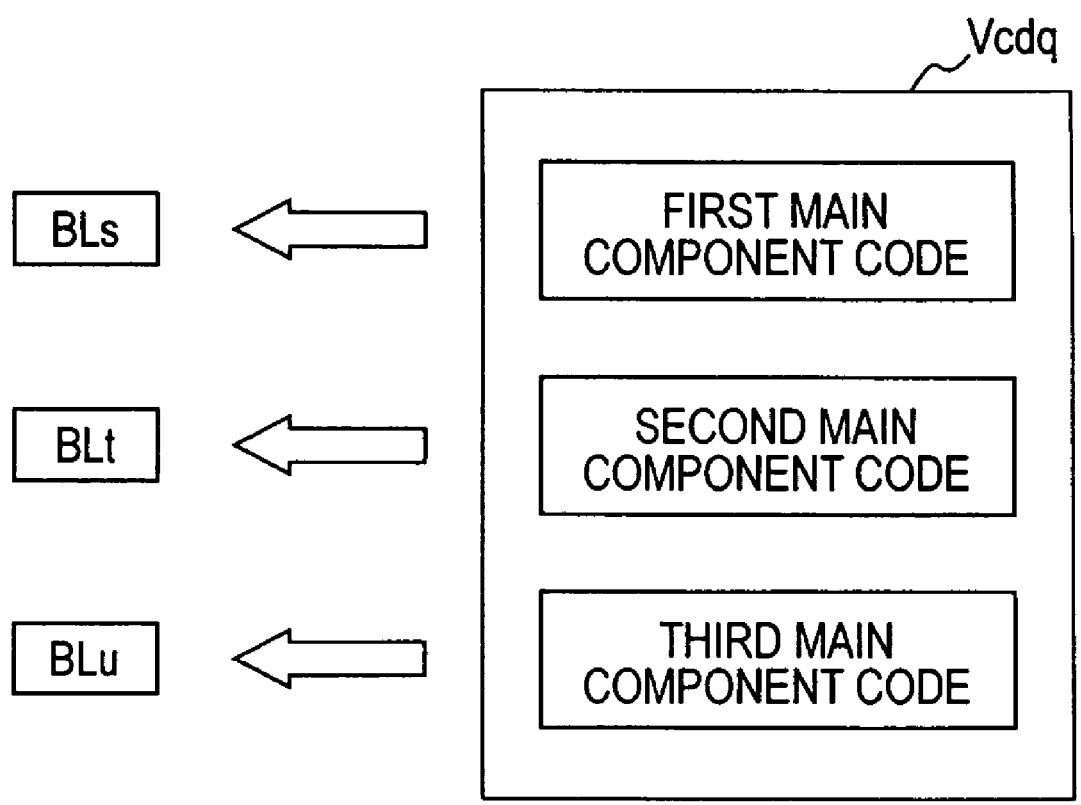
FIG. 15 illustrates a process of an inverse orthogonal transform encoder of FIG. 14.

The inverse orthogonal transform decoder 103 performs, on the digital signal Vcdq, a decoding process (inverse quantization process, etc.) of the encoding method adopted by the orthogonal transform encoder 85 of FIG. 3. Through the decoding process, the first main component block through the N-th main component block are obtained on a per process area basis. More specifically, upon receipt of the digital signal Vcdq of FIG. 11 from the data decomposer 102, the inverse orthogonal transform decoder 103 generates (restores) the first main component block BLs, the second main component block BLt and the third main component block BLu from the first main component code, the second main component code, and the third main component code, respectively, as shown in FIG. 15.

The inverse orthogonal transform decoder 103 generates (restores), on a per process area basis, the M process vectors Va defined by equation (2), namely, the process vectors Va represented in the space defined by the second coordinates system having, as the axes, the first main component through the N-th main component, from the first main component block through the N-th main component block, each having a size of N pixels.

The inverse orthogonal transform decoder 103 performs, on a per process area basis, an inverse axis transform process on each of the M process vectors Va to inverse transform the second coordinates system into the first coordinates system (having an pixel value as an axis). More in detail, the inverse orthogonal transform decoder 103 calculates equation (14), thereby generating (restoring) the M process vectors Vb from the M process vectors Vb respectively on a per process area basis:

$$Vb = (U\sim)^{-1} Va \qquad (14)$$

where $(U\sim)^{-1}$ represents the inverse matrix of the transpose $(U\sim)$ of the element matrix U defined by equation (1), and is a matrix having N×N coefficients contained, as element values, in the digital signal Vcdp supplied from the data decomposer 102. The inverse orthogonal transform decoder 103 can generate the matrix $(U\sim)^{-1}$ using the digital signal Vcdp supplied from the data decomposer 102.

The inverse orthogonal transform decoder 103 supplies the M process vectors Vb to the block decomposer 104 on a per process area basis.

A series of process steps of the inverse orthogonal transform decoder 103 is referred to as an inverse orthogonal transform decoding process.

The block decomposer 104 generates (restores) each process area from the M process vectors Vb supplied from the inverse orthogonal transform decoder 103 on a per process area basis, arranges each process area to the former location thereof prior to segmentation, and outputs a resulting one frame digital video signal to the output unit 105 as one frame digital video signal Vdg2, which is a decoded signal of the encoded digital video signal Vcd of one frame.

More specifically, the first main component block BLs, the second main component block BLt and the third main component block BLu of FIG. 15 are generated (stored) during the inverse orthogonal transform decoding process of the inverse orthogonal transform decoder 103. As shown in FIG. 16, the block decomposer 104 generates (restores) the process area BL composed of the large block BLR (block composed of the R pixel values), the large block BLG (block composed of the G pixel values), and the large block BLB (block composed of the B pixel values) as previously discussed with reference to FIG. 8. The block decomposer 104 arranges a plurality of process areas BL in the locations prior to segmentation as illustrated in FIG. 4, thereby resulting in one frame digital video signal Vdg2. The resulting digital video signal Vdg2 is supplied from the block decomposer 104 to the output unit 105.

The output unit 105 outputs the digital video signal Vdg2 to the D/A converter 55 of FIG. 2.

The structure of the decoder 54 of FIG. 14 has been discussed. The decoding process of the decoder 54 of FIG. 14 is described below with reference to a flowchart of FIG. 17.

In step S61, the input unit 101 receives one frame of the encoded digital video signal Vcd. When the one frame encoded digital video signal Vcd is supplied from the input unit 101 to the data decomposer 102, processing proceeds to step S62.

In step S62, the data decomposer 102 decomposes one frame of encoded digital video signal Vcd into one frame of digital signal Vcdp and one frame of digital signal Vcdq. When the one frame of digital signal Vcdp and the one frame of digital signal Vcdq are supplied to the inverse orthogonal transform decoder 103, processing proceeds to step S63.

In step S63, the inverse orthogonal transform decoder 103 performs the inverse orthogonal transform decoding process on the one of digital signal Vcdq using the one frame of digital signal Vcdp. When the process result from step S63 is supplied to the block decomposer 104, processing proceeds to step S64.

In step S64, the block decomposer 104 generates one frame of digital video signal Vdg2 using the process result in the inverse orthogonal transform decoding process in step S63. When the digital video signal Vdg2 is supplied from the block decomposer 104 to the output unit 105, processing proceeds to step S65.

In step S65, the output unit 105 outputs one frame of digital video signal Vdg2 to the outside.

In step S66, the decoder 54 determines whether all frames to be processed have been processed.

If all frames have not been processed, namely, if the answer to the determination in step S66 is no, processing returns to step S61 to repeat step S61 and subsequent steps. More specifically, a next one frame of encoded digital video signal Vcd is input in step S61, and the decoding process discussed with reference to steps S62 through S64 is performed. As a result, one frame of digital video signal Vdg2 is obtained and output in step S65.

Figure 17:
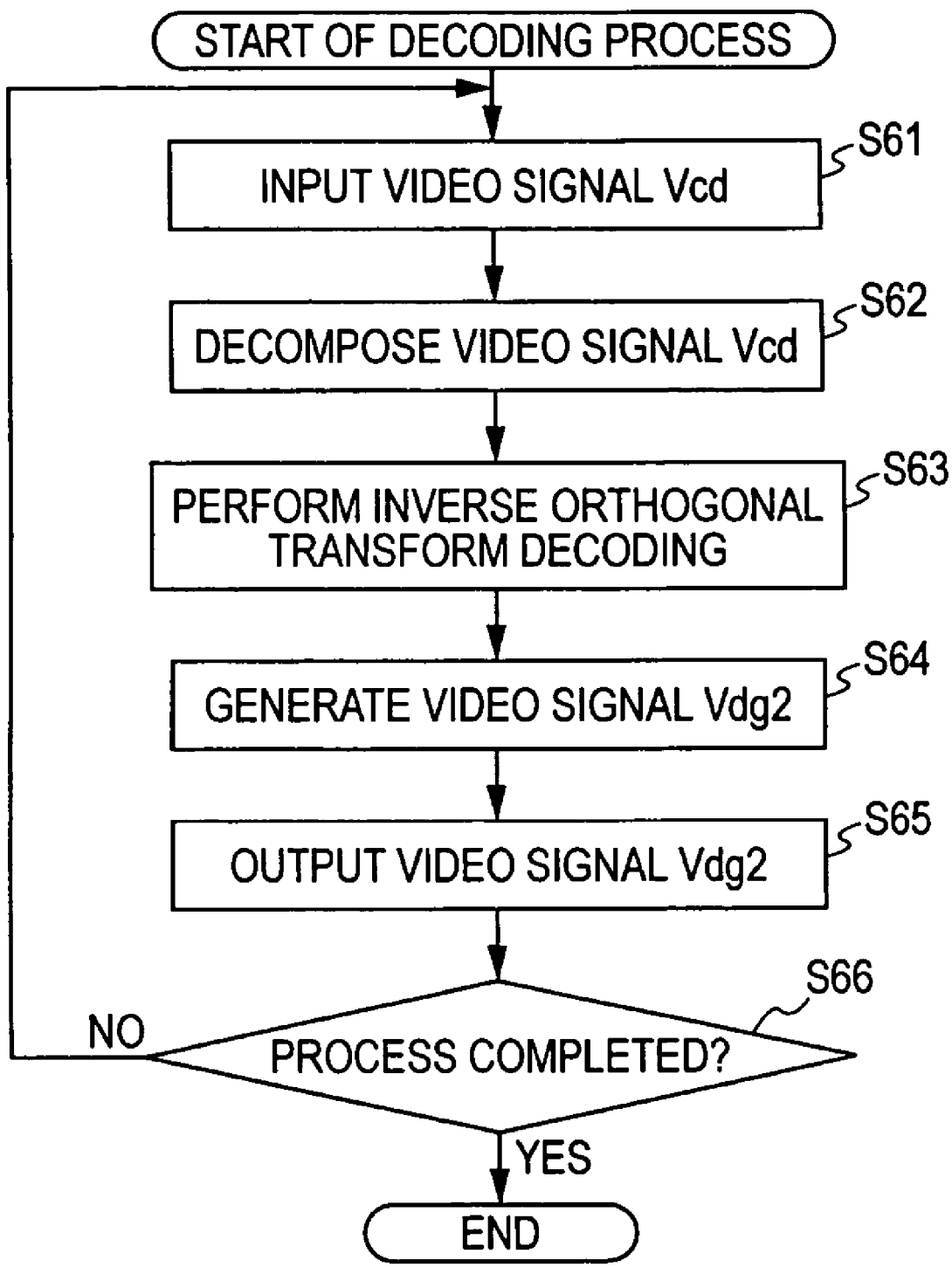
FIG. 17 is a flowchart illustrating a decoding process of the decoder of FIG. 13.

Steps S61 through S66 are looped to process all frames. When last frame of digital video signal Vdg2 is output, the answer to the determination in step S66 is yes. The decoding process of FIG. 17 is thus completed.

The decoding process of the decoder 54 of FIG. 14 has been described with reference to FIG. 17.

As described above, the analog video signal Van1 accompanied by an analog distortion output from the reproducing apparatus 1 of FIG. 2 is supplied to the A/D converter 51 for A/D conversion, and is then output to the decoding section 42 of FIG. 3 as the digital video signal Vdg1.

The encoder 52 of FIG. 3 segments the digital video signal Vdg1 into a plurality of process areas. The encoder 52 of FIG. 3 generates the M N-dimensional process vectors Vb (see equation (2)) from the process area to be processed. The encoder 52 of FIG. 3 generates a basis of orthogonal transform adaptive to the process area to be processed, using the M process vectors Vb of the process area to be processed, for each of the plurality of process areas. The encoder 52 of FIG. 3 performs the orthogonal transform encoding process on the process area to be processed, using the basis of orthogonal transform of the process area to be processed, for each of the plurality of process areas. The encoder 52 of FIG. 3 outputs, as the encoded digital video signal Vcd, a digital signal composed of the digital signal Vcdq indicative of the result of the orthogonal transform encoding process and the digital signal Vcdq indicative of the basis of the corresponding orthogonal transform.

The encoded digital video signal Vcd output from the recorder 53 of FIG. 3 is supplied to the recorder 53 of FIG. 2. The recorder 53 records the encoded digital video signal Vcd onto a recording medium such as an optical disk. The recorder 53 thus performs a copying process in response to the analog video signal Van1.

If the analog video signal Van1 output from the reproducing apparatus 1 is a signal that has undergone a first encoding and decoding operation, the encoded digital video signal Vcd recorded on the recording medium by the recorder 53 becomes a signal that has undergone a second encoding and decoding operation. A digital video signal as a result of decoding by another apparatus (not shown) having the decoder 54 of FIG. 14 also becomes a signal that has undergone a second encoding and decoding operation. The digital video signal that has undergone a second encoding and decoding operation is substantially degraded in comparison with the digital video signal Vdg0 output from the decoder 11 in the reproducing apparatus 1.

This is because the analog video signal Van1 is accompanied by the analog distortion as described above.

More specifically, if the analog video signal Van1 is accompanied by the analog distortion due to signal phase shifting, fluctuations take place in a sampling phase when the A/D converter 51 converts the analog video signal Van1 into a digital signal. The phase fluctuations cause the plurality of process areas, into which the encoder 52 has segmented the digital video signal Vdg1, to shift in position with respect to the position thereof in the first encoding and decoding process.

Because of this, the encoder 52 of FIG. 3 generates a basis of orthogonal transform (each main component) different from the basis of orthogonal transform used in the first encoding in each of the plurality of process areas. Since the orthogonal transform encoding process is performed on the process vector Vb in the process area to be processed, using the orthogonal transform basis in the process area to be processed, a new quantization distortion different from a quantization distortion that took place in the first encoding operation is further generated, thereby becoming a large distortion.

The encoded digital video signal Vcd output from the encoder 52 of FIG. 3, recorded on the recording medium by the recorder 53 of FIG. 2, and then reproduced from the recording medium becomes a substantially degraded image in comparison with an image corresponding to the analog video signal Van1 output from the reproducing apparatus 1, namely, an image displayed on the display 2.

Figure 18:
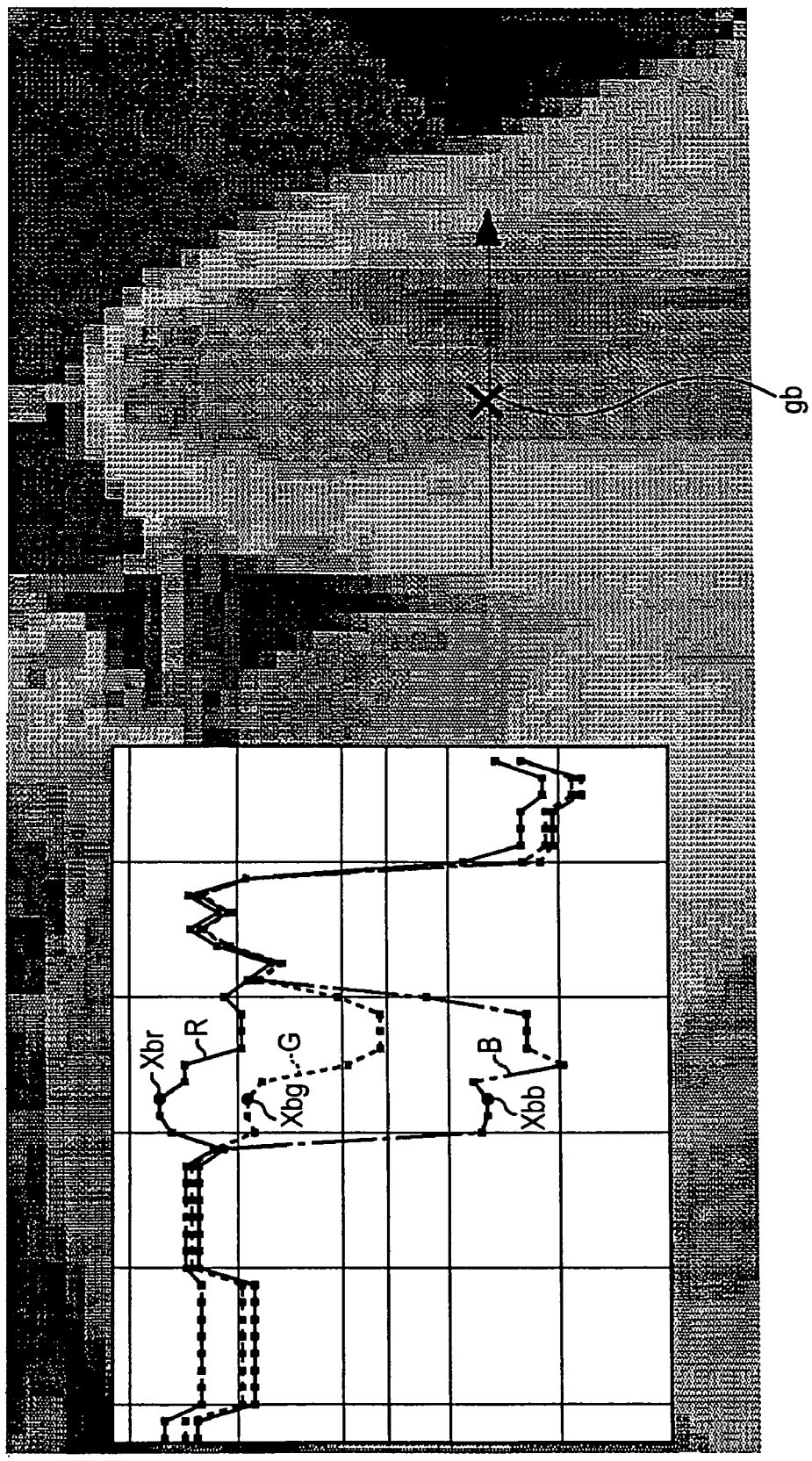
FIG. 18 illustrates an example of a real image obtained through a first cycle of encoding and decoding operations, namely, a real image corresponding to an analog video signal output from a reproducing apparatus.
Figure 19:
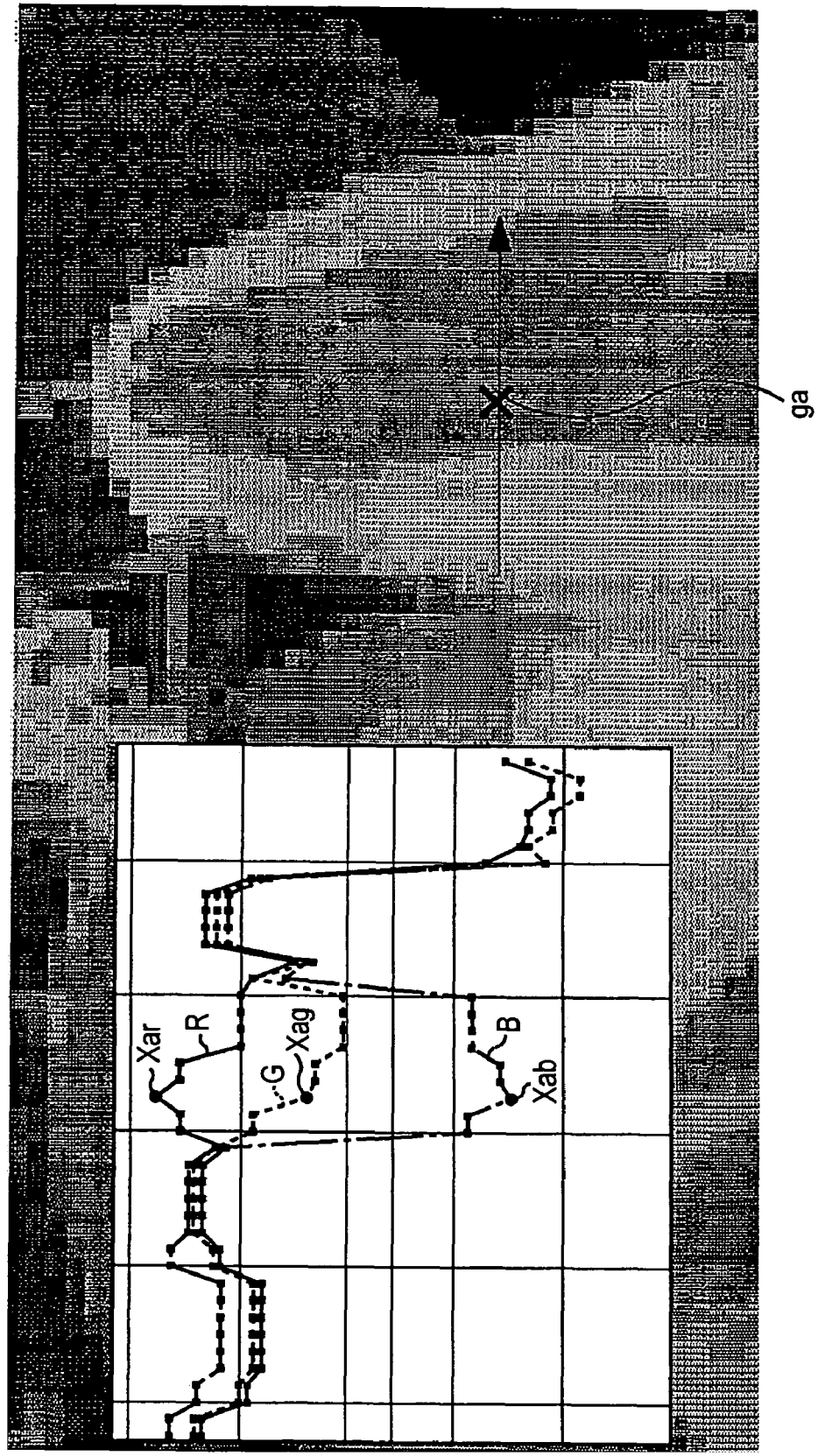
FIG. 19 illustrates an example of a real image obtained through a second cycle of encoding and decoding operations, namely, a real image corresponding to an encoded digital video signal output from the encoder of FIG. 3, recorded onto a recording medium by a recorder of FIG. 2, and then reproduced from the recording medium.

FIGS. 18 and 19 illustrate the encoding method in accordance with the third vector generation method, namely, the encoding method in which the main component analysis is performed on the colors per pixel (the R pixel value, the G pixel value, and the B pixel value). FIG. 18 illustrates a real image obtained through a first encoding and decoding operation, i.e., a real image corresponding to the analog video signal Van1 output from the reproducing apparatus 1. In contrast, FIG. 19 illustrates a real image obtained through a second encoding and decoding operation, i.e., a real image that is obtained by reproducing the encoded digital video signal Vcd from the recording medium after the encoded digital video signal Vcd is output from the decoding section 42 of FIG. 3 and then recorded on the recording medium by the recorder 53 of FIG. 2.

FIGS. 18 and 19 illustrate portions of images in enlargement. Each image is a black and white image converted from an original color image. As shown in FIGS. 18 and 19, graphs in the left portions thereof are plots of the R pixel value, the G pixel value, and the B pixel value of pixels consecutively arranged as shown by arrow-headed lines on the right portion of FIGS. 18 and 19. In each graph, the abscissa represents the pixel position along the arrow-headed line, and the ordinate represents the pixel value (luminance level). Waveform R represents a waveform of the R pixel value, waveform G represents a waveform of the G pixel value, and waveform B represents a waveform of the B pixel value. As shown in FIG. 18, Xbr, Xbg, and Xbb represent the R pixel value, the G pixel value, and the B pixel value of a pixel gb, respectively. As shown in FIG. 19, Xar, Xag, and Xab represent the R pixel value, the G pixel value, and the B pixel value of a pixel ga at the same location as the pixel gb of FIG. 18.

In comparison of FIGS. 18 and 19, pixels surrounding the pixel gb, being blank in FIG. 18 become ones suffering from block distortion with color shifting surrounding the pixel ga in FIG. 19 after the second encoding and decoding operation.

Figure 20:
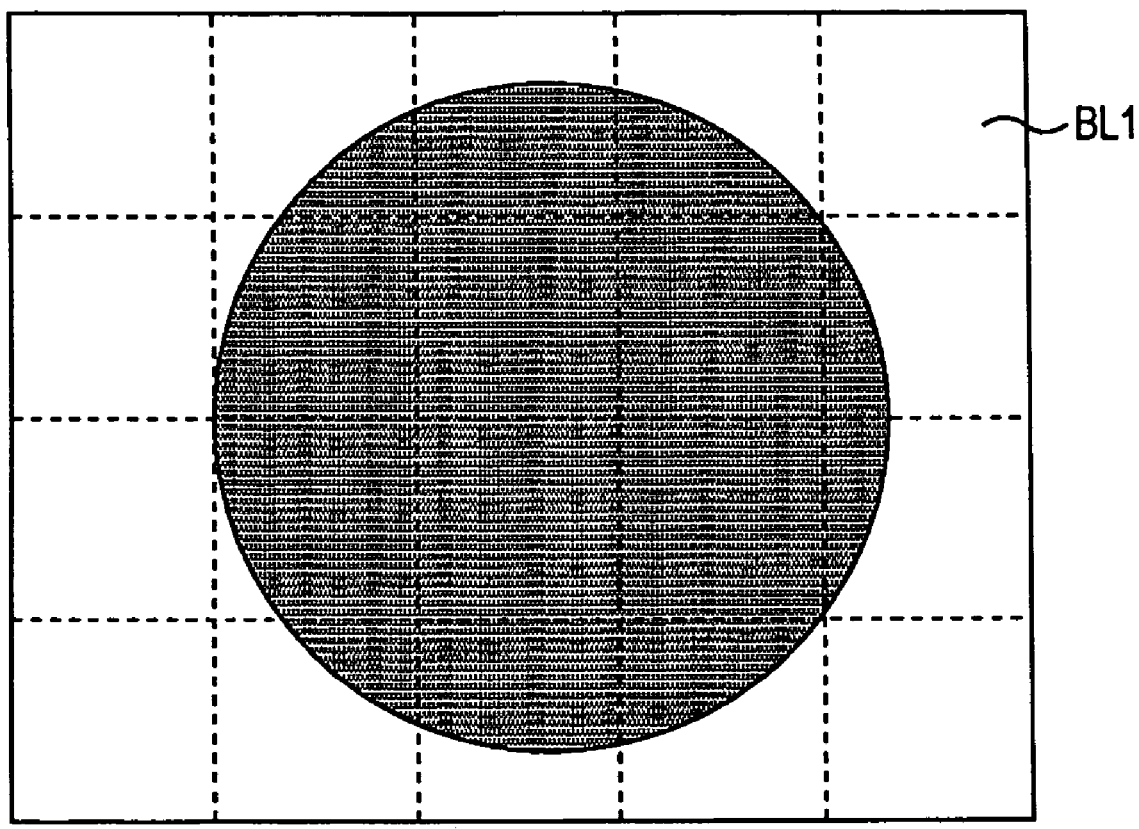
FIG. 20 illustrates an image obtained through a first cycle of encoding and decoding operations, namely, an image corresponding to an analog video signal output from the reproducing apparatus.
Figure 21:
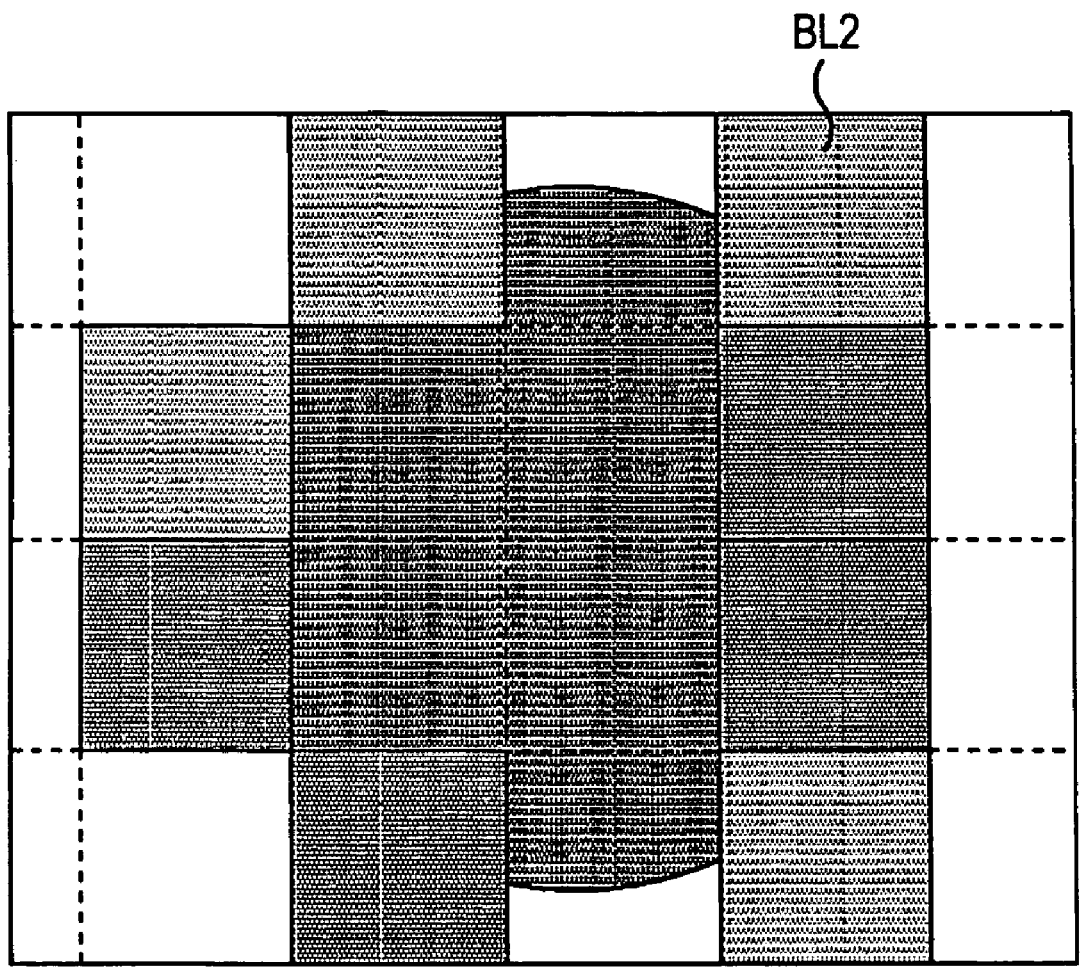
FIG. 21 diagrammatically illustrates an image obtained through a first cycle of encoding and decoding operations, namely, an image corresponding to a digital video signal output from the encoder of FIG. 3, recorded onto a recording medium by the recorder of FIG. 2, and then reproduced from the recording medium.

FIGS. 20 and 21 illustrate the encoding method for the third vector generation method, namely, the encoding method in which the main component analysis is performed on the colors per pixel (the R pixel value, the G pixel value, and the B pixel value). FIG. 20 illustrates a real image obtained through a first encoding and decoding operation, i.e., a real image corresponding to the analog video signal Van1 output from the reproducing apparatus 1. In contrast, FIG. 21 illustrates a real image obtained through a second encoding and decoding operation, i.e., a real image that is obtained by reproducing the encoded digital video signal Vcd from the recording medium after the encoded digital video signal Vcd is output from the decoding section 42 of FIG. 3 and then recorded on the recording medium by the recorder 53 of FIG. 2.

FIGS. 20 and 21 illustrate portions of images in enlargement. Each image is a black and white image converted from an original color image. As shown in FIG. 20, a process area BL1 used in a first encoding operation is denoted by a broken-lined square. As shown in FIG. 21, a process area BL2 used in a second encoding operation is denoted by a solid-lined square.

In comparison of FIGS. 20 and 21, each process area BL1 is optimized in FIG. 20. In contrast, as shown in FIG. 21, a block is mixed with a block, optimized through the first encoding (i.e., the block corresponding to the process area BL1), due to phase shifting through the second encoding, and used as process area BL2. As a result, block color shifting occurs, thereby leading to a visibly unfavorable image.

If the analog video signal Van1 output from the reproducing apparatus 1 has undergone a second or further encoding and decoding operations, a digital video signal encoded by the encoder 52 of FIG. 3 and decoded becomes a signal that has undergone a third or further encoding and decoding operation. The resulting image becomes further degraded.

If the encoded digital video signal having undergone the third or further encoding and decoding operation is recorded onto the recording medium by the recorder 53, and then reproduced, a resulting image becomes a more significantly degraded image in comparison with the image corresponding to the analog video signal Van1 output from the reproducing apparatus 1, i.e., the image displayed on the display 2. The encoding section 41 cannot copy images with excellent image quality maintained. Unauthorized copy is thus discouraged.

For the same reason, in the decoding section 42 having the decoder 54 of FIG. 14, an image displayed on the display 56, i.e., an image corresponding to the analog video signal Van2 output from the D/A converter 55 is significantly degraded in comparison with the image corresponding to the analog video signal Van1 output from the reproducing apparatus 1, namely, the image displayed on the display 2. The degree of degradation becomes severe as the encoding and decoding process is repeated.

In the video processing system including the encoder 52 of FIG. 3 and the decoder 54 of FIG. 14, the recording and encoding apparatus 31 including the encoder 52 of FIG. 3 and the decoder 54 of FIG. 14 performs a process to make it difficult to perform a copying process with excellent image quality maintained. No particular manipulation is performed on the analog video signal Van1 supplied from the reproducing apparatus 1 to the display 2. As a result, the image quality of the image displayed on the display 2 is free from any degradation. More specifically, the video processing system including the encoder 52 of FIG. 3 and the decoder 54 of FIG. 14 overcomes the problem presented by the technique disclosed in Japanese Unexamined Patent Application Publication No. 2001-24527.

As shown in FIGS. 3 and 14, the video processing system including the encoder 52 and the decoder 54 is free from the need to include any particular circuits such as a noise information generator and a circuit for embedding noise information, and from any increase in circuit scale. More specifically, the video processing system of FIG. 2 including the encoder 52 of FIG. 3 and the decoder 54 of FIG. 14 overcomes the problem presented by the technique disclosed in Japanese Unexamined Patent Application Publication No. 10-289522.

If the analog video signal Van1 contains no analog distortion, a process area at the same position as a previous cycle is used in a second and subsequent encoding cycle. As a result, the orthogonal transform basis (main component) generated in the preceding encoding cycle remains almost unchanged in the second and subsequent encoding cycle. The quantization distortion in the second and subsequent encoding cycles is extremely small, and reproduction is performed at normal quality level.

The encoder 52 and the decoder 54 of FIG. 2 in accordance with the embodiment of the present invention have been discussed with reference to FIGS. 3 through 21.

The encoder 52 of FIG. 2 is not limited to the structure discussed with reference to FIG. 3, and may take any of a variety of forms. The decoder 54 of FIG. 2 is not limited to the structure discussed with reference to FIG. 14, and may take any of a variety of forms.

Figure 22:
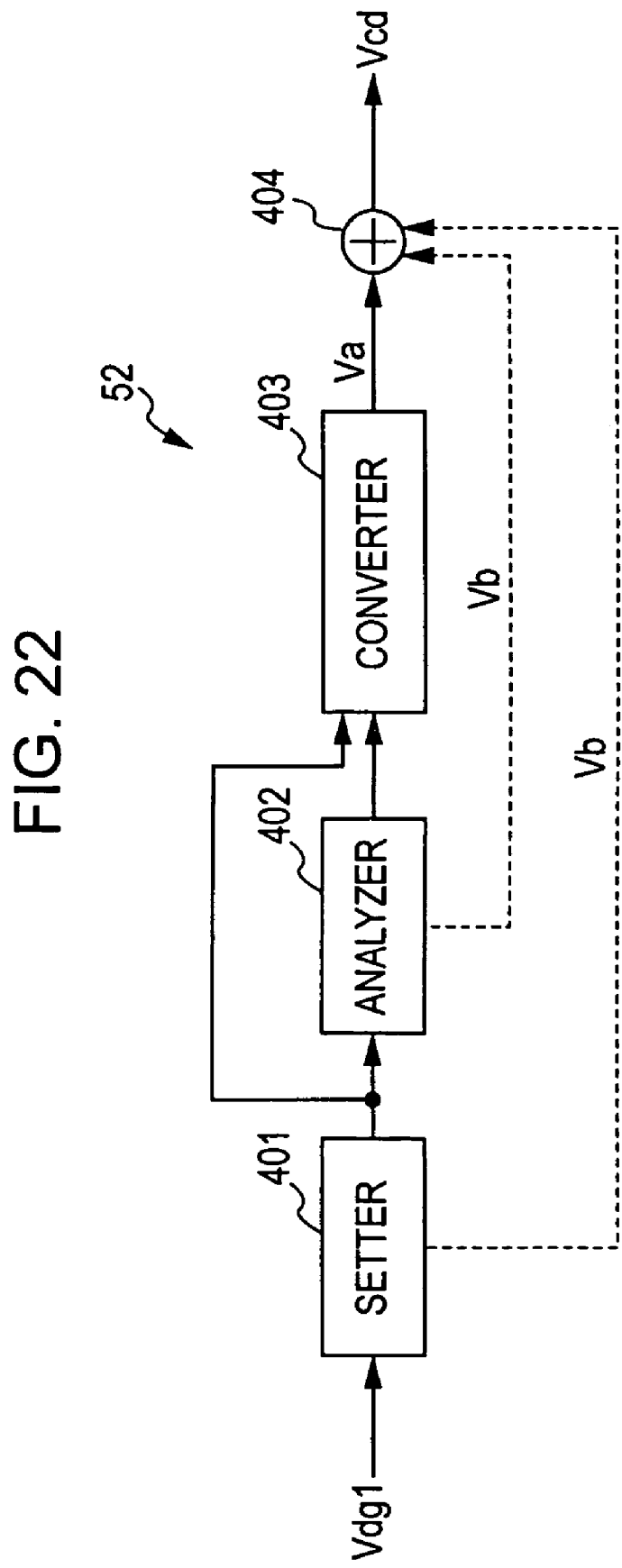
FIG. 22 is a functional block diagram illustrating the encoder of the video processing system of FIG. 2.
Figure 23:
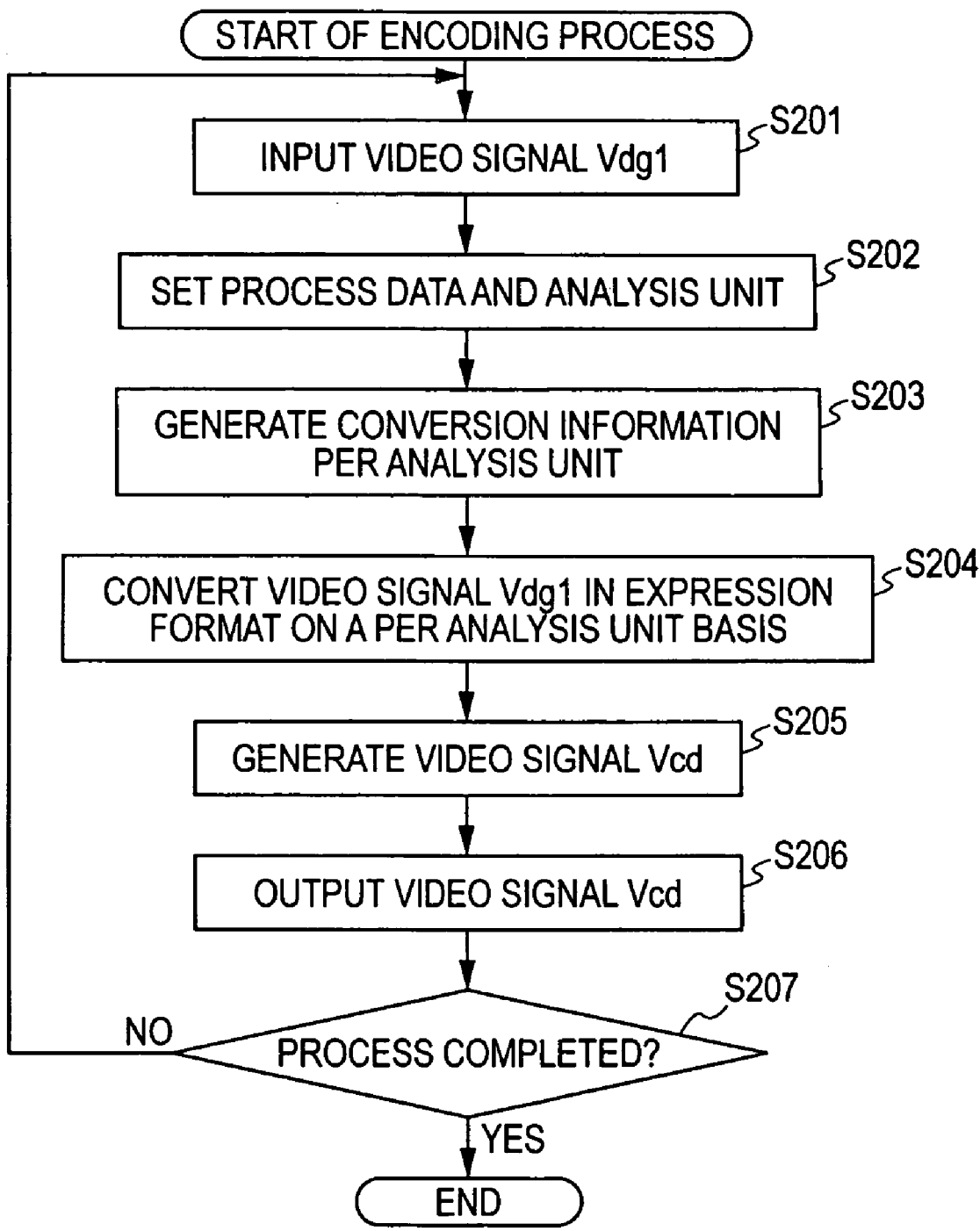
FIG. 23 is a flowchart illustrating an encoding process of the encoder in the functional structure of FIG. 22.

It is sufficient if the encoder 52 of FIG. 2 has a functional structure shown in FIG. 22. The present invention is not limited to any of embodiments that embody the functional structure of FIG. 22. The encoder 52 of FIG. 3 is one of the variety of embodiments. FIG. 22 illustrates a general functional structure of the encoder 52 of FIG. 2 (comprehensive concept of the example of FIG. 3). FIG. 23 is a flowchart of the encoding process of the encoder 52 having the functional structure of FIG. 22.

Figure 24:
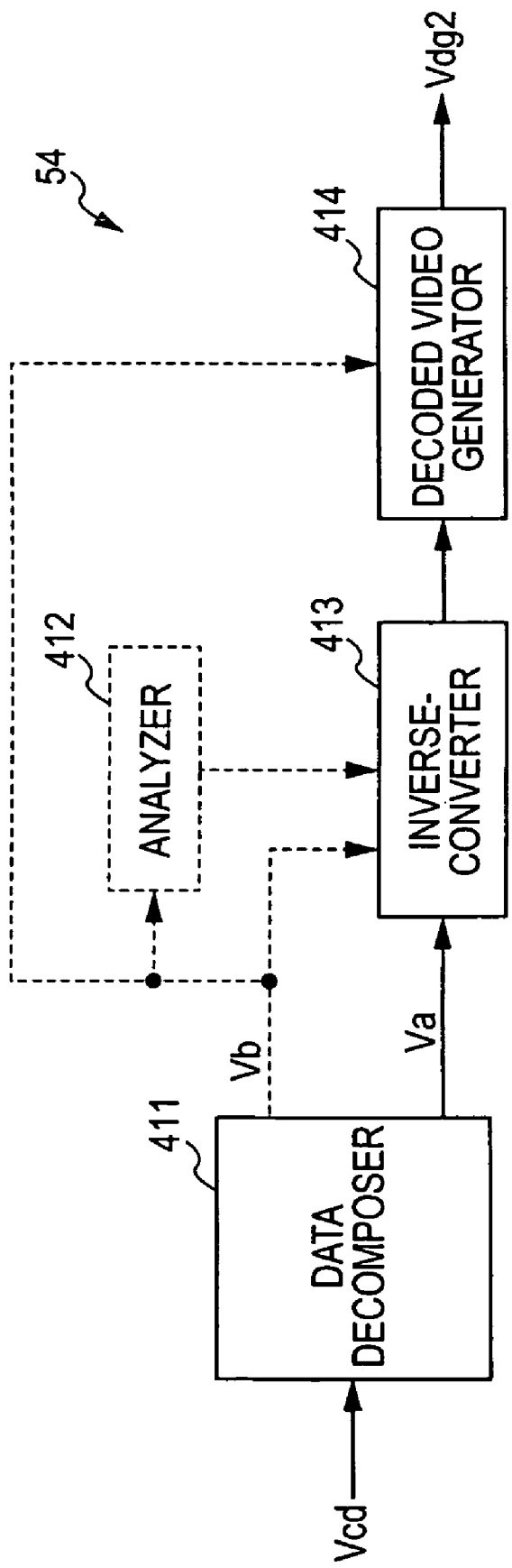
FIG. 24 is a functional block diagram illustrating the decoder corresponding to the encoder of FIG. 22 in the video processing system of FIG. 2.
Figure 25:
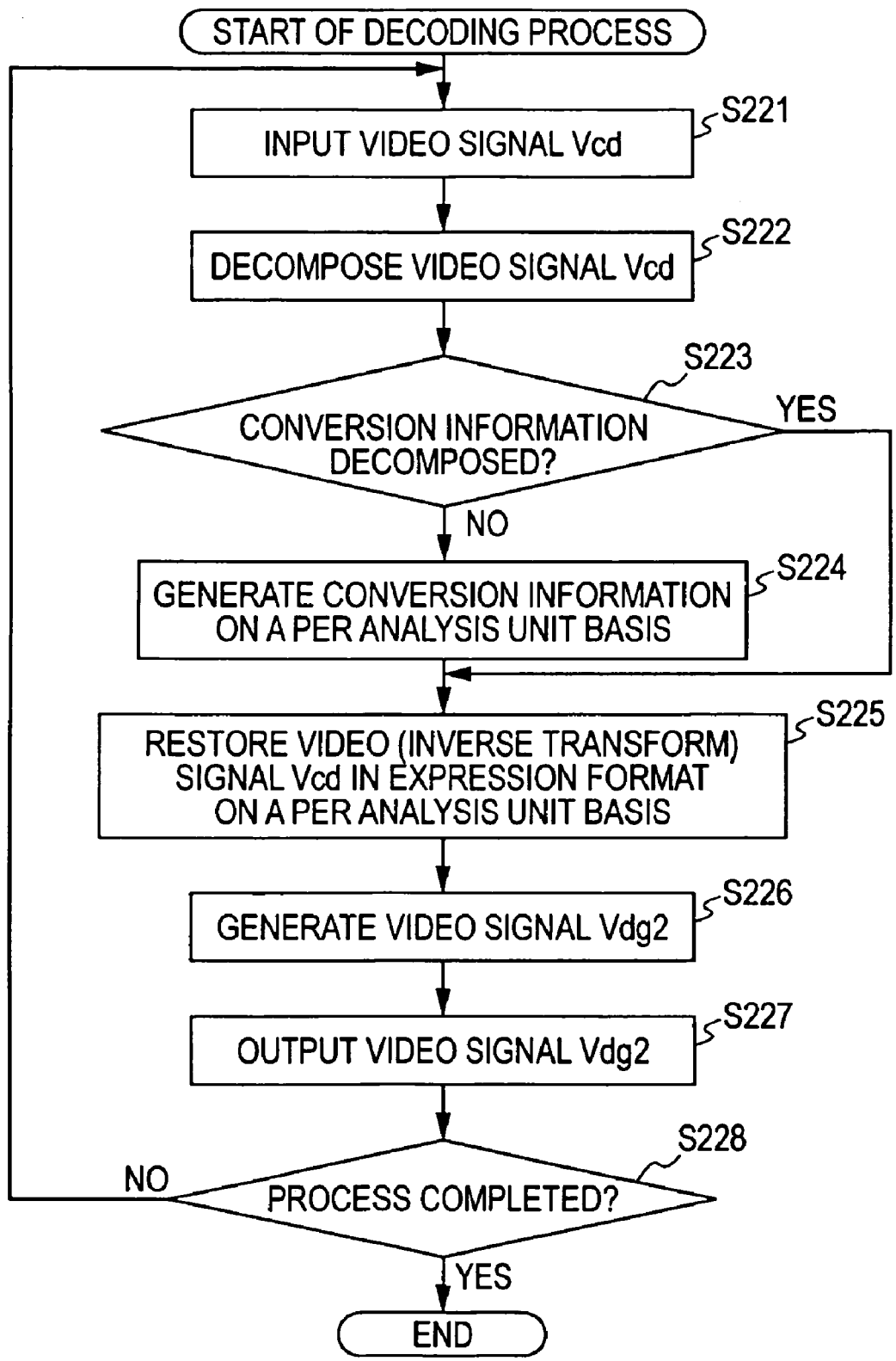
FIG. 25 is a flowchart illustrating a decoding process of the decoder of FIG. 24.

Similarly, it is sufficient if the decoder 54 of FIG. 2 has a functional structure of FIG. 24. The present invention is not limited to any of embodiments that embody the functional structure of FIG. 24. The decoder 54 of FIG. 14 is one of a variety of embodiments that embody the functional structure of FIG. 24. FIG. 24 illustrates a general functional structure of the decoder 54 of FIG. 2 (comprehensive concept of the example of FIG. 14). FIG. 25 is a flowchart of the decoding process of the decoder 54 having the functional structure of FIG. 23.

The encoder 52 and the decoder 54 of FIG. 2 are described below with reference to FIGS. 22 through 24.

As shown in FIG. 22, the encoder 52 includes a setter 401, an analyzer 402, a converter 403, and a superimposer 404.

The setter 401 sets process data represented in N dimensions from the digital video signal Vdg1 as input data, sets M units of process data as an analysis unit, and generates at least one data group composed of M units of process data. The setter 401 supplies at least one data group to the analyzer 402 and the converter 403.

If the setter 401 generates information required for the decoder 54 of FIG. 24 to generate conversion information (hereinafter referred to as conversion information generating information) to be discussed later, the conversion information generating information is supplied to the superimposer 404 as a digital signal Vb as necessary. If the setter 401 generates or uses information required for the decoder 54 of FIG. 24 to generate other information for use in decoding (hereinafter referred to as decode information generating information), the decode information generating information is supplied to the superimposer 404 as a digital signal Vb.

In the encoder 52 of FIG. 3, the setter 401 includes the process area segmentor 82 and the vectorizer 83. More specifically, in the encoder 52 of FIG. 3, a N-dimensional process vector generated by the vectorizer 83 is used as the process data. M process vectors generated from one process area are used as an analysis unit. In other words, the process area, into which the process area segmentor 82 segments the digital video signal Vdg1, is used as an analysis unit.

The analyzer 402 of FIG. 22 sets each of at least one data group supplied from the setter 401 as a data group to be processed, then analyzes the data group to be processed, then generates, on a per data group, conversion information for converting an expression format of the data group to be processed, and then supplies the generated conversion information to the converter 403.

The conversion information or the conversion information generating information responsive thereto is supplied from the analyzer 402 to the superimposer 404 as the digital signal Vb. If the decode information generating information is generated or used by the analyzer 402, the decode information generating information is supplied from the analyzer 402 to the superimposer 404 as the digital signal Vb as necessary.

In the encoder 52 of FIG. 3, the analyzer 402 includes the orthogonal transform basis generator 84. More specifically, in the encoder 52 of FIG. 3, the orthogonal transform basis (the first through N-th main components) on a per process area basis generated by the orthogonal transform basis generator 84 is adopted as the conversion information. In the encoder 52 of FIG. 3, the digital signal Vcdp output from the orthogonal transform basis generator 84 is adopted as one of digital signals Vb of FIG. 22 as the conversion information itself.

The converter 403 of FIG. 22 converts the expression format of each of the M units of process data forming the data group to be processed, in each of the data groups supplied from the setter 401, using the conversion information of the data group to be processed, out of the conversion information supplied from the analyzer 402. The converter 403 supplies at least one data group in the converted expression format to the superimposer 404 as the digital signal Va.

The conversion information shows or defines the relationship between a first expression format still unconverted by the converter 403 and a second expression format converted by the converter 403.

In addition to an axis conversion, the conversion of the expression formation may or may not include an encoding process (such as quantization) in accordance with a predetermined encoding method. In the case of the axis conversion, the encoder 52 can be part of a data converter converting the expression format of data. In the case of the encoding process, the converter 403 encodes at least one data group in the converted expression format, and supplies the resulting signal as the digital signal Va to the superimposer 404.

In the encoder 52 of FIG. 3, the converter 403 includes the orthogonal transform encoder 85. More specifically, in the encoder 52 of FIG. 3, the digital signal Vcdq output from the orthogonal transform encoder 85 is used as the digital signal Va of FIG. 22.

The superimposer 404 superimposes the digital signal Vb supplied from at least one of the setter 401 and the analyzer 402 (at least one of the conversion information, the conversion information generating information and the decode information generating information) on the digital signal Va supplied from the converter 403, and supplies the resulting digital signal to the recorder 53 and the decoder 54 of FIG. 2 as the encoded digital video signal Vcd.

For example, in the encoder 52 of FIG. 3, the superimposer 404 includes the superimposer 86.

The functional structure of the encoder 52 of FIG. 2 has been discussed with reference to FIG. 22.

The encoding process of the encoder 52 having the functional structure of FIG. 22 is described below with reference to a flowchart of FIG. 23.

In step S201, the setter 401 inputs one frame of digital video signal Vdg1.

In step S202, the setter 401 sets process data and analysis unit from the one frame of digital video signal Vdg1. When the one frame of a plurality units of process data is divided by analysis unit, and at least one data group formed of M units of process data, namely, at least one data group equal to one frame is supplied from the setter 401 to the analyzer 402 and the converter 403, processing proceeds to step S203.

In step S203, the analyzer 402 generates one frame of conversion information on a per analysis unit basis. More specifically, the analyzer 402 generates the conversion information of each of at least one data group equal to one frame. When one frame of conversion information per analysis unit is supplied from the analyzer 402 to the converter 403, processing proceeds to step S204.

In step S204, the converter 403 converts the expression format of one frame of digital video signal Vdg1 on a per analysis unit basis using the one frame of conversion information per analysis unit. The converter 403 converts the expression format of the data group to be processed, in each of at least one data group equal to one frame, using the conversion information of the data group to be processed. As a result of the process in step S204, one frame of digital signal Va is obtained. When the digital signal Va is supplied from the converter 403 to the superimposer 404, processing proceeds to step S205.

In step S205, the superimposer 404 superimposes the digital signal Vb supplied from at least one of the setter 401 and the analyzer 402 onto one frame of digital signal Va supplied from the converter 403, thereby generating the encoded digital video signal Vcd.

In step S206, the superimposer 404 outputs the encoded digital video signal Vcd.

In step S207, the encoder 52 determines whether all frames to be processed have been processed.

If it is determined that all frames have not been processed yet, namely, if the answer to the determination in step S207 is no, processing returns to step S201 to repeat step S201 and subsequent steps. More specifically, a next one frame of digital video signal Vdg1 is input in step S201, and the encoding process is repeated in steps S202 through S205. As a result, a next one frame of encoded digital video signal Vcd is obtained, and then output in step S206.

Steps S201 through S207 are looped to process all fames. When last frame of encoded digital video signal Vcd is output, the answer to the determination in step S207 is yes, and the encoding process of FIG. 23 is completed.

The encoding process of the encoder 52 having the functional structure of FIG. 22 has been discussed with reference to FIG. 23.

The functional structure of the decoder 54 corresponding to the encoder 52 having the function structure of FIG. 22 is described below with reference to FIGS. 24 and 25.

As shown in FIG. 24, the decoder 54 includes a data decomposer 411 through a decoded video generator 414. As will be described later, the analyzer 412 may be omitted as appropriate.

The data decomposer 411 receives the encoded digital video signal Vcd supplied from the encoder 52 having the functional structure of FIG. 22.

The data decomposer 411 decomposes the encoded digital video signal Vcd into the digital signal Va output from the converter 403 of FIG. 22 and the digital signal Vb output from at least one of the setter 401 and the analyzer 402 of FIG. 22.

As described above, the digital signal Vb contains at least one of the conversion information, the conversion information generating information responsive to the conversion information, and the decode information generating information. If the digital signal Vb contains the conversion information, the data decomposer 411 supplies the conversion information to the inverse-converter 413. If the digital signal Vb contains the conversion information generating information, the data decomposer 411 supplies the conversion information generating information to the analyzer 412. If the digital signal Vb contains the decode information generating information, the data decomposer 411 supplies the decode information generating information to one of the analyzer 412 through the decoded video generator 414.

In the decoder 54 of FIG. 14, the data decomposer 411 includes the data decomposer 102.

Upon receipt of the conversion information generating information as the digital signal Vb from the data decomposer 411, the analyzer 412 generates the conversion information on a per analysis unit (the conversion information corresponding to the output of the analyzer 402 of FIG. 22) using the conversion information generating information, and supplies the conversion information to the inverse-converter 413. The analyzer 412 generates the conversion information for each of at least one data group, and supplies the conversion information to the inverse-converter 413.

Since the digital signal Vb contains no conversion information generating information in the decoder 54 of FIG. 14, in other words, the digital signal Vb includes the digital signal Vcdp, which is the conversion information itself, the analyzer 412 is omitted.

The inverse-converter 413 converts the digital signal Va supplied from the data decomposer 411 back to the original format thereof using the conversion information per analysis unit supplied from the data decomposer 411 as the digital signal Vb or the conversion information per analysis unit supplied from the analyzer 412. More specifically, the inverse-converter 413 converts the data group to be processed back to the original expression format in each of the process data in the converted expression format (at least one data group), using the conversion information of the data group to be processed. The inverse-converter 413 supplies, to the decoded video generator 414, the process data per analysis unit in the original expression format (at least one data group).

In addition to the expression format conversion through the above-described axis conversion, the expression format conversion may or may not include the decoding process (inverse quantization) corresponding to the encoding method used by the converter 403 of FIG. 22. If the axis conversion is used, the decoder 54 is interpreted as being part or whole of a data inverse converting apparatus for inverse converting the expression format of data. If the inverse quantization process is used, the inverse-converter 413 decodes the digital signal Va supplied from the data decomposer 411 and causes the resulting signal to revert back to the original expression format.

In the decoder 54 of FIG. 14, for example, the inverse-converter 413 includes the inverse orthogonal transform decoder 103.

Using the process data per analysis unit (at least one data group) caused to revert back to the original expression format by the inverse-converter 413, the decoded video generator 414 generates the digital video signal Vdg2 that is a decoded signal of the encoded digital video signal Vcd input to the data decomposer 411, and supplies the digital video signal Vdg2 to the D/A converter 55 of FIG. 2.

In the decoder 54 of FIG. 14, the decoded video generator 414 includes the block decomposer 104.

If the digital signal Vb, which is the decode information generating information, is supplied, the analyzer 412 through the decoded video generator 414 execute the above-described variety of processes as necessary using the decode information generating information.

The decoder 54 having the functional structure of FIG. 24 has been discussed. The decoding process of the decoder 54 having the functional structure of FIG. 24 is described below with reference to a flowchart of FIG. 25.

In step S221, the data decomposer 411 receives one frame of encoded digital video signal Vcd.

In step S222, the data decomposer 411 decomposes the one frame of encoded digital video signal Vcd into one frame of digital signal Va and one frame of digital signal Vb.

In step S223, the data decomposer 411 determines whether the conversion information has been decomposed.

If the digital signal Vb decomposed from the encoded digital video signal Vcd in step S222 contains one frame of conversion information per analysis unit, the data decomposer 411 proceeds to step S225 without performing the process in step S224 after determining in step S223 the conversion information has been decomposed. The digital signal Vb, which is one frame of conversion information per analysis unit, is then supplied from the data decomposer 411 to the inverse-converter 413.

In contrast, if the digital signal Vb decomposed from the encoded digital video signal Vcd in step S222 contains no conversion information but contains one frame of conversion information generating information per analysis unit, the data decomposer 411 determines in step S223 that the conversion information has not been decomposed. The digital signal Vb, which one frame of conversion information generating information per analysis unit, is supplied from the data decomposer 411 to the analyzer 412. Processing proceeds to step S224.

In step S224, the analyzer 412 generates one frame of conversion information per analysis unit using one frame of conversion information generating information per analysis unit. When the one frame of conversion information per analysis unit is supplied from the analyzer 412 to the inverse-converter 413, processing proceeds to step S225.

In step S225, the inverse-converter 413 causes one frame of encoded digital video signal Vcd to revert back to the original expression format thereof on a per analysis unit basis using the one frame of conversion information per analysis unit supplied from one of the data decomposer 411 and the analyzer 412. In other words, the process in step S225 is interpreted as an inverse process of the conversion process in step S204 of FIG. 23.

The reversion of the expression format of the encoded digital video signal Vcd to the original format on a per analysis unit basis results in the process data per analysis unit in the original expression format (at least one data group). Through the process in step S225, the process data per analysis unit in the original expression format (at least one data group) is supplied from the inverse-converter 413 to the decoded video generator 414. Processing proceeds to step S226.

In step S226, the decoded video generator 414 generates, from the process data per analysis unit in the original expression format (at least one data group), one frame of digital video signal Vdg2, which is a decoded signal of one frame of encoded digital video signal Vcd input in step S221.

In step S227, the decoded video generator 414 outputs the one frame of digital video signal Vdg2.

In step S228, the decoder 54 determines whether all frames to be processed have been processed.

If it is determined that all frames have not been processed yet, i.e., if the answer to the determination in step S228 is no, processing returns to step S221 to repeat step S221 and subsequent steps. More specifically, a next one frame of encoded digital video signal Vcd is input in step S221, and the above-described decoding process is performed in steps S222 through S226. As a result, a next frame of digital video signal Vdg2 is obtained and output in step S227.

Steps S221 through S228 are looped to process all frames. When last frame of digital video signal Vdg2 is output, the answer to the determination in step S228 becomes yes. The decoding process of FIG. 25 is completed.

The decoding process of the decoder 54 having the functional structure of FIG. 24 has been discussed with reference to FIG. 25.

The encoder 52 of FIG. 2 and the decoder 54 corresponding thereto have been discussed in detail with reference to FIGS. 3 through 25.

The video processing system of embodiments of the present invention is not limited to the system of FIG. 2. The present invention may be implemented in a variety of embodiments. The present invention is not limited to any particular arrangement as long as the arrangement includes the encoder 52 having the functional structure of FIG. 22 and the decoder 54 having the functional structure of FIG. 24. For example, the video processing system of one embodiment of the present invention may be arranged as shown in FIG. 26.

Figure 26:
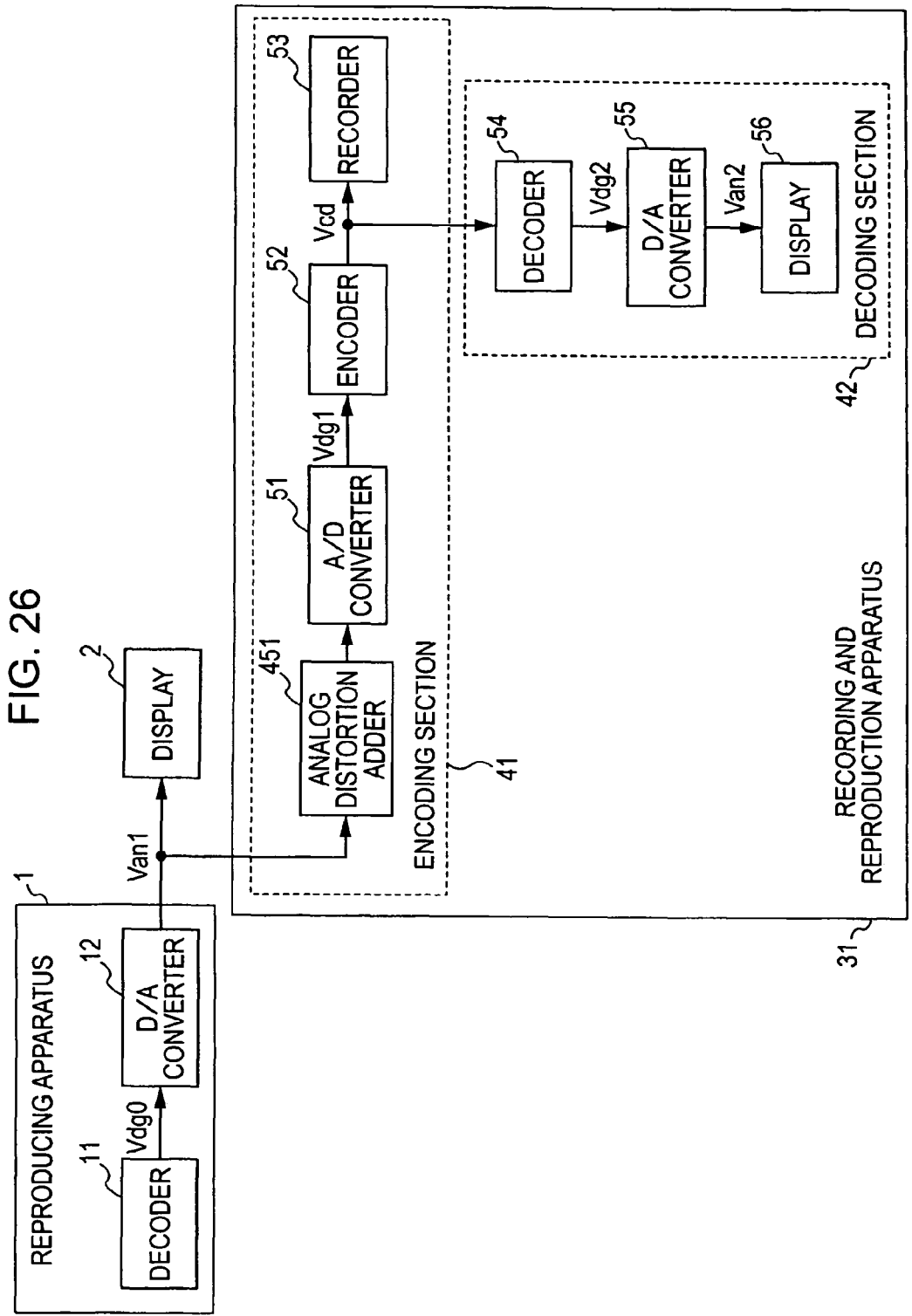
FIG. 26 is a block diagram illustrating a video processing system of one embodiment of the present invention different from the video processing system of FIG. 2.

FIG. 26 illustrates the video processing system of one embodiment of the present invention.

In the video processing system of FIG. 26, elements identical to those in the video processing system of FIG. 2 are designated with the same reference numerals and the discussion thereof is omitted as appropriate.

In comparison of the system of FIG. 26 with the system of FIG. 2, the encoding section 41 of FIG. 26 includes further an analog distortion adder 451 in addition to the encoding section 41 of FIG. 2.

The analog distortion adder 451 positively generates an analog signal to the analog video signal Van1 output from the reproducing apparatus 1 as the name thereof implies. The analog distortion adder 451 then supplies the A/D converter 51 with the analog video signal Van1 with the analog noise forcibly added thereto.

The layout position of the analog distortion adder 451 is not limited to that of FIG. 26. For example, the analog distortion adder 451 may be arranged behind the D/A converter 55 in the decoding section 42, or behind the D/A converter 12.

The remaining structure of the video processing system of FIG. 26 is identical to that of the video processing system of FIG. 2. The video processing system of FIG. 26 is generally identical in operation to the video processing system of FIG. 2 except that the analog distortion adder 451 forces the analog distortion to be added to the analog video signal Van1, and the discussion of the operation of the video processing system of FIG. 26 is thus omitted herein.

The above-referenced series of process steps may partly or entirely be performed in hardware or software.

Figure 27:
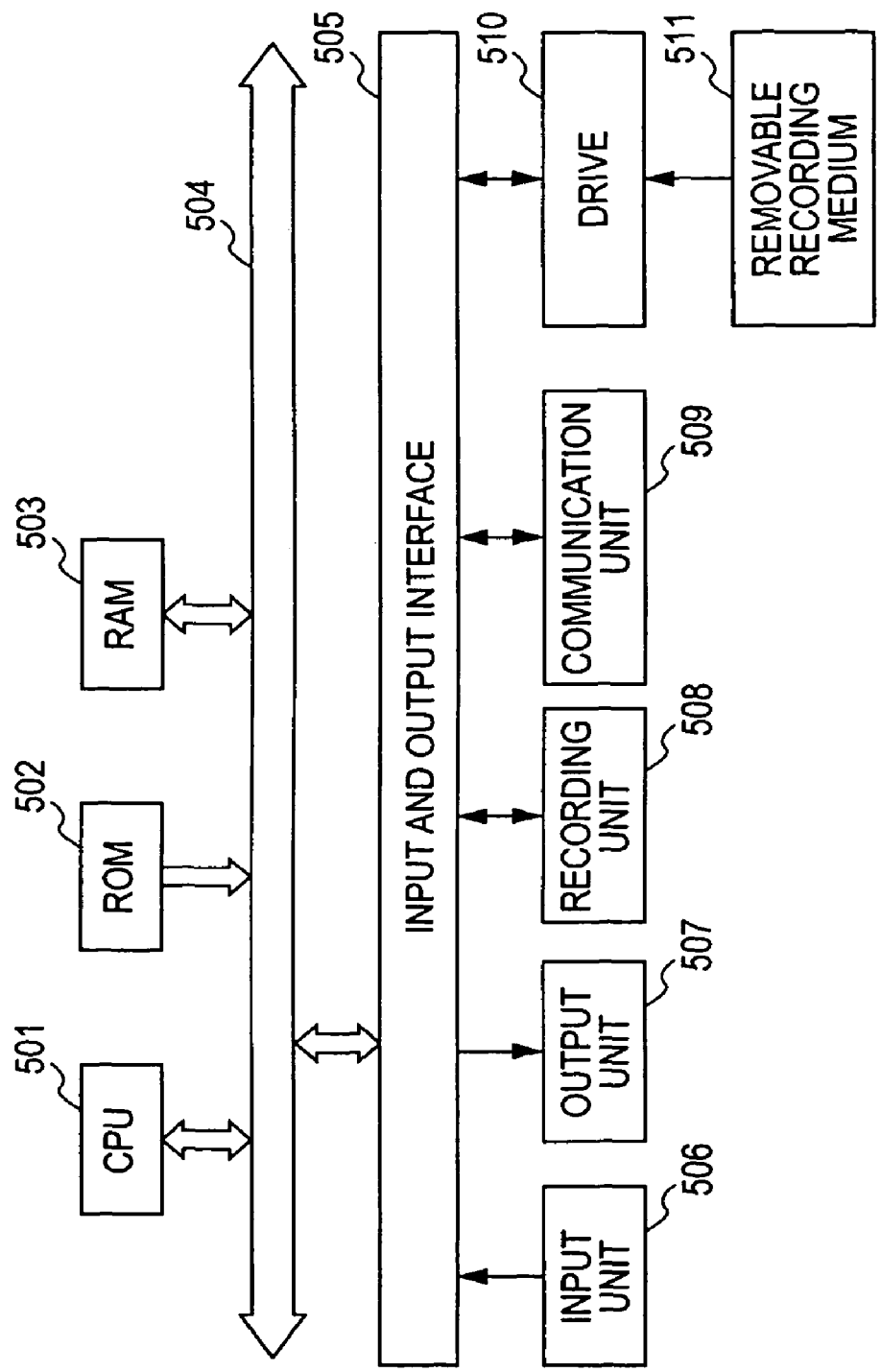
FIG. 27 is a block diagram of a hardware structure of part of an encoding section and a decoding section in accordance with one embodiment of the present invention.

In the video processing systems of FIG. 2 and FIG. 26, part (for example, the encoder 52 or the decoder 54) or whole of each of the encoding section 41 and the decoding section 42 is implemented by a computer having a structure of FIG. 27.

As shown in FIG. 27, a central processing unit (CPU) 501 performs a variety of processes in accordance with a program stored in a read-only memory (ROM) 502, and a program loaded from a recording unit 508 to a random-access memory (RAM) 503. The RAM 503 also stores data required for the CPU 501 to perform a variety of programs.

The CPU 501, the ROM 502, and the RAM 503 are mutually connected to each other via a bus 504. The bus 504 also connects to an input and output interface 505.

The input and output interface 505 connects to an input unit 505 including a keyboard and a mouse, an output unit 507 such as a display, a recording unit 508 such as a hard disk, and a communication unit 509 including a modem and a terminal adaptor. The communication unit 509 performs a communication process to communicate with another apparatus via networks including the Internet.

The input and output interface 505 connects to a drive 510, as necessary. The drive 510 is loaded with a removable recording medium 511 such as a magnetic disk, an optical disk, a magneto-optical disk, or a semiconductor memory. A computer program read from the removable recording medium 511 is installed onto the recording unit 508, as necessary.

To perform the series of process steps in software, the computer program forming the software is installed via the network or from the recording medium onto a computer built in dedicated hardware or a general-purpose personal computer that can perform a variety of functions when a variety of programs are installed thereon.

As shown in FIG. 27, the recording medium having stored the program includes the removable medium 511 distributed to a user separate from the apparatus to provide the user with the program. The recording media include, for example, a magnetic disk (including a floppy disk), an optical disk (such as compact disk read-only memory (CD-ROM)), or digital versatile disk (DVD)), a magneto-optical disk (such as minidisk (MD®), and a semiconductor memory. The recording media also include the ROM 502, and a hard disk loaded on the recording unit 508', each having stored the program.

The process steps describing the program stored on the recording medium may be performed in the time-series order sequence as previously stated. Alternatively, the process steps may be performed in parallel or separately.

In the context of this specification, the system refers to an entire system including a plurality of apparatuses, and processing units.

In the previous discussion, an object to be encoded or decoded is the video signal. Alternatively, the object to be encoded or decoded may be any other signal.

In the previous discussion, the frame is the unit handled in the above-described variety of processes. Alternatively, the unit in the processes may be a field. If the units in the processes, such as the frame and the field, are referred to as an access unit, the unit of process is the access unit in the previous discussion.

In accordance with the embodiments of the present invention, the video data is encoded and decoded. In a manner free from occurrence of undisplayed image, and an increase in circuit scale, unauthorized copying using the analog video signal is discouraged by significantly degrading the video data in the second and subsequent cycles of encoding and decoding.

It should be understood by those skilled in the art that various modifications, combinations, sub-combinations and alterations may occur depending on design requirements and other factors insofar as they are within the scope of the appended claims or the equivalents thereof.

It should be understood by those skilled in the art that various modifications, combinations, sub-combinations and alterations may occur depending on design requirements and other factors insofar as they are within the scope of the appended claims or the equivalents thereof.

What is claimed is:

1. A data converting apparatus, comprising:
   segmenting means for setting a predetermined access unit, as an access unit to be processed, out of input data containing at least one access unit containing a plurality of data components per pixel, and for segmenting the predetermined access unit into at least one block;
   analyzing means for generating, on a per analysis block basis, a basis for converting an expression format of each of the plurality of data components by respectively setting, as at least one analysis block, an at least one segmented block, and for performing a main component analysis on the plurality of data components on a per at least one analysis block basis, wherein the main component analysis comprises averaging position vectors and calculating a difference vector and mean value therefrom;
   converting means for converting the expression format of each of the plurality of data components per pixel forming the block to be processed, by successively setting, as at least one block to be processed, the at least one segmented block, and by using a predetermined one of at least one basis generated by the analyzing means; and
   vectorizing means for generating an N-dimensional first vector having values of N data components (N is an integer equal to 1 or larger) as element values thereof per pixel, on every M pixels (M is an integer equal to 1 or larger) in the block to be processed, by successively setting, as the block to be processed on a one-by-one basis, the at least one segmented block,
   wherein the analyzing means generates the basis of the block to be analyzed by performing the main component analysis on the M first vectors generated by the vectorizing means when the block to be analyzed becomes the block to be processed.

2. The data converting apparatus according to claim 1, further comprising analog distortion generating means for generating an analog distortion in the input data.

3. The data converting apparatus according to claim 1, wherein the converting means encodes, on a per predetermined unit basis, a data group containing the plurality of data components per pixel in the converted expression format in the block to be processed.

4. The data converting apparatus according to claim 1, wherein the converting means respectively converts the M first vectors of the block to be processed, from among the first vectors represented by a first coordinate system having each of the N data components as an axis thereof, into M second vectors represented by a second coordinate system having, as an axis, the basis generated by the analyzing means when the block to be processed becomes the block to be analyzed.

5. The data converting apparatus according to claim 4, wherein the converting means encodes, on a per predetermined unit basis, a data group containing the M second vectors in the block to be processed.

6. The data converting apparatus according to claim 1, wherein the plurality of data components includes first pixel data representing a red luminance level of a corresponding pixel, second pixel data representing a green luminance level of the corresponding pixel, and a third luminance level representing a blue luminance level of the corresponding pixel.

7. A data converting method for converting at least part of an expression format of input data containing at least one access unit containing a plurality of data components per pixel, the method comprising:
   setting a predetermined access unit of the input data, as an access unit to be processed, and segmenting the predetermined access unit into at least one block;
   generating, on a per analysis block basis, a basis for converting an expression format of each of the plurality of data components by respectively setting, as at least one analysis block, the at least one segmented block, and performing a main component analysis on the plurality of data components on a per at least one analysis block basis, wherein the main component analysis comprises averaging position vectors and calculating a difference vector and mean value therefrom;
   converting the expression format of each of the plurality of data components per pixel forming the block to be processed by successively setting, as at least one block to be processed, the at least one segmented block, and by using a predetermined one of at least one basis generated in the analyzing step; and vectorizing by generating an N-dimensional first vector having values of N data components (N is an integer equal to 1 or larger) as element values thereof per pixel, on every M pixels (M is an integer equal to 1 or larger) in the block to be processed, by successively setting, as the block to be processed on a one-by-one basis, the at least one segmented block, wherein the generating the basis for converting generates the basis of the block to be analyzed by performing the main component analysis on the M first vectors generated by the vectorizing when the block to be analyzed becomes the block to be processed.

8. A non-transitory recording medium storing a computer program for causing a computer to perform a data converting method of converting at least part of an expression format of input data containing at least one access unit containing a plurality of data components per pixel, the data converting method comprising:

setting a predetermined access unit of the input data, as an access unit to be processed, and segmenting the predetermined access unit into at least one block;

generating, on a per analysis block basis, a basis for converting an expression format of each of the plurality of data components by respectively setting, as at least one analysis block, the at least one segmented block, and performing a main component analysis on the plurality of data components on a per at least one analysis block basis, wherein the main component analysis comprises averaging position vectors and calculating a difference vector and mean value therefrom;

converting the expression format of each of the plurality of data components per pixel forming the block to be processed by successively setting, as at least one block to be processed, the at least one segmented block, and by using a predetermined one of at least one basis generated in the analyzing step; and vectorizing by generating an N-dimensional first vector having values of N data components (N is an integer equal to 1 or larger) as element values thereof per pixel, on every M pixels (M is an integer equal to 1 or larger) in the block to be processed, by successively setting, as the block to be processed on a one-by-one basis, the at least one segmented block, wherein the generating the basis for converting generates the basis of the block to be analyzed by performing the main component analysis on the M first vectors generated by the vectorizing when the block to be analyzed becomes the block to be processed.

9. A data inverse converting apparatus in a system in which a predetermined first access unit is set as an access unit to be processed out of original data containing at least one first access unit containing a plurality of data components per pixel, and the first access unit to be processed is segmented into at least one block;

the at least one segmented block is successively set as at least one analysis block, a main component analysis is performed on each of the plurality of data components on a per at least one analysis block basis, a basis for converting an expression format of each of the plurality of data components is generated on a per analysis block basis, wherein the main component analysis comprises averaging position vectors and calculating a difference vector and mean value therefrom; and the at least one segmented block is successively set as a block to be processed, the expression format of each of the plurality of data components per pixel forming the block to be processed is converted using a predetermined one of at least one generated basis, a second access unit containing the plurality of data components per pixel in the converted expression format is generated, and the data inverse converting apparatus receives input data containing the basis being input as part of the input data, the basis being used to generate the second access unit;

the data inverse converting apparatus comprises:

separating means for separating the input data into the second access unit and the basis; and inverse converting means for inverse converting, using the separated basis, the expression format of the plurality of data components per pixel forming the separated second access unit.

10. A data inverse converting method of a data inverse converting apparatus in a system in which a predetermined first access unit is set as an access unit to be processed out of original data containing at least one first access unit containing a plurality of data components per pixel, and the first access unit to be processed is segmented into at least one block;

the at least one segmented block is successively set as at least one analysis block, a main component analysis is performed on each of the plurality of data components on a per at least one analysis block basis, and a basis for converting an expression format of each of the plurality of data components is generated on a per analysis block basis, wherein the main component analysis comprises averaging position vectors and calculating a difference vector and mean value therefrom; and the at least one segmented block is successively set as a block to be processed, the expression format of each of the plurality of data components per pixel forming the block to be processed is converted using a predetermined one of at least one generated basis, a second access unit containing the plurality of data components per pixel in the converted expression format is generated, and the data inverse converting apparatus receives input data containing the basis being input as part of the input data, the basis being used to generate the second access unit;

the data inverse converting method comprises:

separating the input data into the second access unit and the basis; and inverse converting, using the separated basis, the expression format of the plurality of data components per pixel forming the separated second access unit.

11. A non-transitory recording medium storing a computer program for causing a computer to perform a data inverse converting method of a data inverse converting apparatus in a system in which a predetermined first access unit is set as an access unit to be processed out of original data containing at least one first access unit containing a plurality of data components per pixel, and the first access unit to be processed is segmented into at least one block;

the at least one segmented block is successively set as at least one analysis block, a main component analysis is performed on each of the plurality of data components on a per at least one analysis block basis, and a basis for converting an expression format of each of the plurality of data components is generated on a per analysis block basis, wherein the main component analysis comprises averaging position vectors and calculating a difference vector and mean value therefrom; and the at least one segmented block is successively set as a block to be processed, the expression format of each of the plurality of data components per pixel forming the block to be processed is converted using a predetermined one of at least one generated basis, a second access unit containing the plurality of data components per pixel in the converted expression format is generated, and the data inverse converting apparatus receives input data containing the basis being input as part of the input data, the basis being used to generate the second access unit;

the data inverse converting method comprises:

separating the input data into the second access unit and the basis; and inverse converting, using the separated basis, the expression format of the plurality of data components per pixel forming the separated second access unit.

12. A data inverse converting apparatus in a system in which a predetermined access unit is set as an access unit to be processed out of original data containing at least one access unit containing a plurality of data components per pixel, and the access unit to be processed is segmented into at least one block;

the at least one segmented block is successively set as at least one analysis block, a main component analysis is performed on each of the plurality of data components on a per at least one analysis block basis, and a basis for converting an expression format of each of the plurality of data components is generated on a per analysis block basis, wherein the main component analysis comprises averaging position vectors and calculating a difference vector and mean value therefrom; and the at least one segmented block is successively set as a block to be processed, the expression format of each of the plurality of data components per pixel forming the block to be processed is converted using a predetermined one of at least one generated basis, a data group containing the plurality of data components per pixel in the converted expression format is encoded, at least one unit of encoded data respectively corresponding to the at least one block is obtained, and the inverse converting apparatus receives input data containing the basis being input as part of the input data, the basis being used to generate and being associated with the at least one unit of encoded data;

the data inverse converting apparatus comprises:

separating means for separating the input data into the at least one unit of encoded data and the basis associated with the at least one unit of encoded data; and inverse converting means for successively setting the at least one separated unit of encoded data as a unit of encoded data to be processed one by one, for decoding the unit of encoded data to be processed, and for inverse converting, using the basis associated with the unit of encoded data to be processed from among the bases separated from the input data, the expression format of the plurality of data components per pixel forming the data group obtained as a result of decoding.

13. The data inverse converting apparatus according to claim 12, wherein the original data contains an analog distortion.

14. The data inverse converting apparatus according to claim 12, wherein:

the at least one block is successively set one by one as a unit of block to be processed, and N-dimensional first vectors having values of N data components (N being an integer equal to 2 or larger) as component values per pixel are generated every M pixels (M being an integer equal to 1 or larger) corresponding to the block to be processed;

the basis of the block to be analyzed is generated when the main component analysis is performed on the M first vectors that are generated after the block to be analyzed becomes the block to be processed; and each of the M first vectors of the block to be processed, from among the first vectors represented by a first coordinate system having as an axis each of the N data components, is converted into each of M second vectors represented by a second coordinate system having as an axis thereof the basis generated when the block to be processed becomes the block to be analyzed, the data group containing the M second vectors is encoded on a per predetermined unit basis, and as a result, at least one unit of encoded data corresponding to the at least one block is obtained;

the input data containing the basis being input as part of the input data is input, the basis being used to generate and being associated with the at least one unit of encoded data; and the inverse converting means decodes one of encoded data to be processed, and respectively inverse converts the M second vectors forming the data group obtained as a result of decoding the one of encoded data to be processed, into the M first vectors using the basis associated with the one unit of encoded data to be processed.

15. The data inverse converting apparatus according to claim 12, wherein the plurality of data components includes first pixel data representing a red luminance level of a corresponding pixel, second pixel data representing a green luminance level of the corresponding pixel, and a third luminance level representing a blue luminance level of the corresponding pixel.

16. A data inverse converting method of a data inverse converting apparatus in a system in which a predetermined access unit is set as an access unit to be processed out of original data containing at least one access unit containing a plurality of data components per pixel, and the access unit to be processed is segmented into at least one block;

the at least one segmented block is successively set as at least one analysis block, a main component analysis is performed on each of the plurality of data components on a per at least one analysis block basis, and a basis for converting an expression format of each of the plurality of data components is generated on a per analysis block basis, wherein the main component analysis comprises averaging position vectors and calculating a difference vector and mean value therefrom; and the at least one segmented block is successively set as a block to be processed, the expression format of each of the plurality of data components per pixel forming the block to be processed is converted using a predetermined one of at least one generated basis, a data group containing the plurality of data components per pixel in the converted expression format is encoded, at least one unit of encoded data respectively corresponding to the at least one block is obtained, and the inverse converting apparatus receives input data containing a basis being input as part of the input data, the basis being used to generate and being associated with the at least one unit of encoded data;

the data inverse converting method comprises:
separating the input data into the at least one unit of encoded data and the basis associated with the at least one unit of encoded data; and
successively setting the at least one separated unit of encoded data as a unit of encoded data to be processed one by one, decoding the unit of encoded data to be processed, and inverse converting, using the basis associated with the unit of encoded data to be processed from among the bases separated from the input data, the expression format of the plurality of data components per pixel forming the data group obtained as a result of decoding.

17. A non-transitory recording medium storing a computer program for causing a computer to perform a data inverse converting method of a data inverse converting apparatus in a system in which a predetermined access unit is set as an access unit to be processed out of original data containing at least one access unit containing a plurality of data components per pixel, and the access unit to be processed is segmented into at least one block;
the at least one segmented block is successively set as at least one analysis block, a main component analysis is performed on each of the plurality of data components on a per at least one analysis block basis, and a basis for converting an expression format of each of the plurality of data components is generated on a per analysis block basis, wherein the main component analysis comprises averaging position vectors and calculating a difference vector and mean value therefrom; and
the at least one segmented block is successively set as a block to be processed, the expression format of each of the plurality of data components per pixel forming the block to be processed is converted using a predetermined one of at least one generated basis, a data group containing the plurality of data components per pixel in the converted expression format is encoded, at least one unit of encoded data respectively corresponding to the at least one block is obtained, and the inverse converting apparatus receives input data containing the basis being input as part of the input data, the basis being used to generate and being associated with the at least one unit of encoded data;
the data inverse converting method comprises:
separating the input data into the at least one unit of encoded data and the basis associated with the at least one unit of encoded data; and
successively setting the at least one separated unit of encoded data as a unit of encoded data to be processed one by one, decoding the unit of encoded data to be processed, and inverse converting, using the basis associated with the unit of encoded data to be processed from among the bases separated from the input data, the expression format of the plurality of data components per pixel forming the data group obtained as a result of decoding.

18. A data converting apparatus, comprising:
a segmentor operable to set a predetermined access unit, as an access unit to be processed, out of input data containing at least one access unit containing a plurality of data components per pixel, and to segment the predetermined access unit into at least one block;
an analyzer operable to generate, on a per analysis block basis, a basis for converting an expression format of each of the plurality of data components by respectively setting, as at least one analysis block, the at least one segmented block, and to perform a main component analysis on the plurality of data components on a per at least one analysis block basis, wherein the main component analysis comprises averaging position vectors and calculating a difference vector and mean value therefrom;
a converter operable to convert the expression format of each of the plurality of data components per pixel forming the block to be processed, by successively setting, as at least one block to be processed, the at least one segmented block, and by using a predetermined one of at least one basis generated by the analyzer; and
a vectorizer to generate an N-dimensional first vector having values of N data components (N is an integer equal to 1 or larger) as element values thereof per pixel, on every M pixels (M is an integer equal to 1 or larger) in the block to be processed, by successively setting, as the block to be processed on a one-by-one basis, the at least one segmented block,
wherein the analyzer generates the basis of the block to be analyzed by performing the main component analysis on the M first vectors generated by the vectorizer when the block to be analyzed becomes the block to be processed.

19. A data inverse converting apparatus in a system in which a predetermined first access unit is set as an access unit to be processed out of original data containing at least one first access unit containing a plurality of data components per pixel, and the first access unit to be processed is segmented into at least one block;
the at least one segmented block is successively set as at least one analysis block, a main component analysis is performed on each of the plurality of data components on a per at least one analysis block basis, and a basis for converting an expression format of each of the plurality of data components is generated on a per analysis block basis, wherein the main component analysis comprises averaging position vectors and calculating a difference vector and mean value therefrom; and
the at least one segmented block is successively set as a block to be processed, the expression format of each of the plurality of data components per pixel forming the block to be processed is converted using a predetermined one of at least one generated basis, a second access unit containing the plurality of data components per pixel in the converted expression format is generated, and the data inverse converting apparatus receives input data containing the basis being input as part of the input data, the basis being used to generate the second access unit;
the data inverse converting apparatus comprises:
a separator operable to separate the input data into the second access unit and the basis; and
an inverter operable to inverse convert, using the separated basis, the expression format of the plurality of data components per pixel forming the separated second access unit.

20. A data inverse converting apparatus in a system in which a predetermined access unit is set as an access unit to be processed out of original data containing at least one access unit containing a plurality of data components per pixel, and the access unit to be processed is segmented into at least one block;
the at least one segmented block is successively set as at least one analysis block, a main component analysis is performed on each of the plurality of data components on a per at least one analysis block basis, and a basis for converting an expression format of each of the plurality of data components is generated on a per analysis block basis, wherein the main component analysis comprises averaging position vectors and calculating a difference vector and mean value therefrom; and the at least one segmented block is successively set as a block to be processed, the expression format of each of the plurality of data components per pixel forming the block to be processed is converted using a predetermined one of at least one generated basis, a data group containing the plurality of data components per pixel in the converted expression format is encoded, at least one unit of encoded data respectively corresponding to the at least one block is obtained, and the inverse converting apparatus receives input data containing the basis being input as part of the input data, the basis being used to generate and being associated with the at least one unit of encoded data;

the data inverse converting apparatus comprises:

a separator operable to separate the input data into the at least one unit of encoded data and the basis associated with the at least one unit of encoded data; and an inverter operable to successively set the at least one separated unit of encoded data as a unit of encoded data to be processed one by one, to decode the unit of encoded data to be processed, and to inverse convert, using the basis associated with the unit of encoded data to be processed from among the bases separated from the input data, the expression format of the plurality of data components per pixel forming the data group obtained as a result of decoding.

* * * * *